(12) United States Patent
Iwama et al.

(10) Patent No.: US 10,268,201 B2
(45) Date of Patent: Apr. 23, 2019

(54) VEHICLE AUTOMATED PARKING SYSTEM AND METHOD

(71) Applicants:Mitsubishi Electric Research Laboratories, Inc., Cambridge, MA (US); Mitsubishi Electric Corporation, Chiyoda-ku, Tokyo (JP)

(72) Inventors: Haruyuki Iwama, Tokyo (JP); Chen Feng, Cambridge, MA (US); Yuichi Taguchi, Arlington, MA (US)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 117 days.

(21) Appl. No.: 15/444,583

(22) Filed: Feb. 28, 2017

(65) Prior Publication Data

US 2018/0246515 A1 Aug. 30, 2018

(51) Int. Cl.
*G01C 22/00* (2006.01)
*G05D 1/00* (2006.01)
*G05D 1/02* (2006.01)
*B60R 11/04* (2006.01)
*B60W 30/06* (2006.01)
(Continued)

(52) U.S. Cl.
CPC ........... *G05D 1/0221* (2013.01); *B60R 1/002* (2013.01); *B60R 11/04* (2013.01); *B60W 30/06* (2013.01); *B62D 15/0285* (2013.01); *G01C 21/3407* (2013.01); *G05B 13/0265* (2013.01); *G05D 1/0088* (2013.01); *G05D 1/0246* (2013.01); *G05D 1/0251* (2013.01); *G06K 9/00805* (2013.01); *G06K 9/00812* (2013.01); *B60R 2300/60* (2013.01); *B60R 2300/806* (2013.01); *G05D 1/0255* (2013.01); *G05D 1/0257* (2013.01)

(58) Field of Classification Search
CPC ....... G05D 1/0221; B60R 1/002; B60R 11/04; B60W 30/06; G01C 21/3407; B62D 7/159; G06K 9/00798
USPC ............................... 701/25, 41; 348/43, 118
See application file for complete search history.

(56) References Cited

U.S. PATENT DOCUMENTS 7,737,866 B2  6/2010  Wu et al.
8,497,782 B2  7/2013  Barth et al.
(Continued)

FOREIGN PATENT DOCUMENTS

EP        1065642 A2   1/2001
JP      2012066614 A   4/2012

*Primary Examiner* — Mahmoud S Ismail
(74) *Attorney, Agent, or Firm* — Gennadiy Vinokur; James McAleenan; Hironori Tsukamoto

(57) ABSTRACT

A system controls motion of vehicle according to a first parking path ending at a target state and determines a second parking path from a current state to the target state using a model of the parking space. The system acquires images of the parking space during the motion of the vehicle along the first parking path and constructs the model of the parking space. The model is used to generate a set of virtual images of the environment of the parking space as viewed from virtual viewpoints outside of the first parking path. The current state of the vehicle is determined by comparing a current image of the parking space with at least one virtual image. The second parking path is determined from the current state to the target state.

17 Claims, 34 Drawing Sheets

(51) Int. Cl.

| | | |
|---|---|---|
| *G01C 21/34* | (2006.01) | |
| *B60R 1/00* | (2006.01) | |
| *G05B 13/02* | (2006.01) | |
| *G06K 9/00* | (2006.01) | |
| *B62D 15/02* | (2006.01) | |
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G06F 7/00* | (2006.01) | |
| *G06F 17/00* | (2006.01) | |
| *G06F 19/00* | (2018.01) | |
| *H04N 13/00* | (2018.01) | |
| *H04N 7/00* | (2011.01) | |
| *H04N 7/18* | (2006.01) | |

(56) References Cited

U.S. PATENT DOCUMENTS

| | | |
|---|---|---|
| 8,862,321 B2 | 10/2014 | Moshchuk et al. |
| 9,140,553 B2 | 9/2015 | Grimm et al. |
| 2011/0087405 A1* | 4/2011 | Moshchuk ............. B62D 7/159 |
| | | 701/41 |
| 2014/0368636 A1* | 12/2014 | Lee .................... G06K 9/00812 |
| | | 348/118 |
| 2016/0165215 A1* | 6/2016 | Gu ....................... H04N 13/111 |
| | | 348/43 |

\* cited by examiner

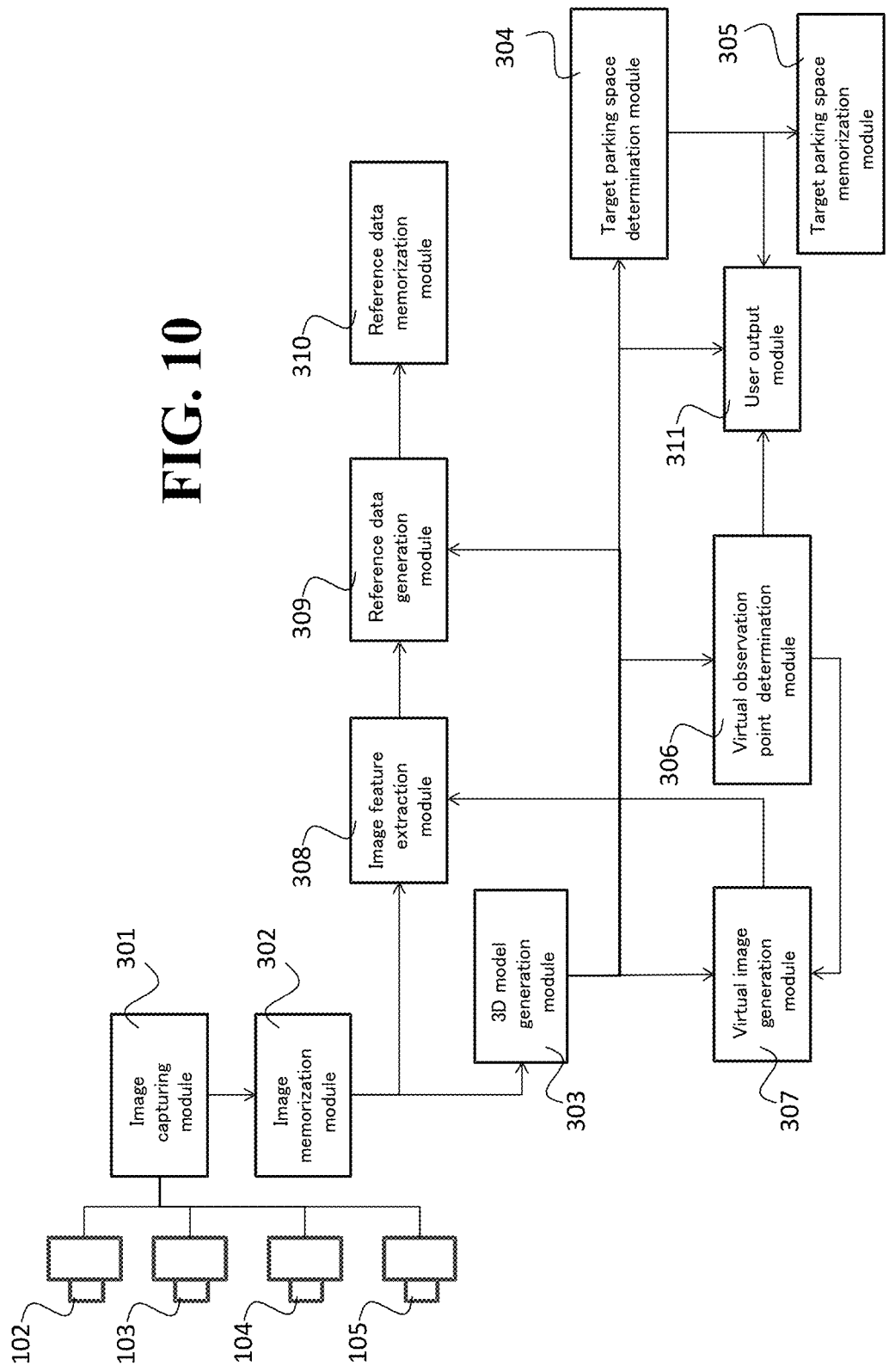

VEHICLE AUTOMATED PARKING SYSTEM AND METHOD

TECHNICAL FIELD

This invention relates generally to path planning for vehicles, and more particularly to path planning methods for automatically parking a vehicle into a target space.

BACKGROUND

Several control systems employed by vehicles, either autonomous vehicles or semi-autonomous vehicles executing in autonomous-driving mode, predict future, safe motions, or paths, of the vehicle, both in order to avoid obstacles, such as other vehicles or pedestrians, and to optimize some criteria associated to the operation of the vehicle. The target state can either be a fixed location, a moving location, a velocity vector, a region, or a combination thereof. One of the tasks for controlling the autonomous or semi-autonomous vehicles is to automatically park a vehicle into a parked position and orientation referred herein as a target state.

Most existing path planning solutions only cope with specific parking scenarios. For instance, a method described in U.S. Pat. No. 7,737,866 calculates paths for parallel parking and back-in parking. The method described in U.S. Pat. No. 8,497,782 also assumes a special structure of the parking path. Also, the method described in U.S. Pat. No. 8,862,321 addresses parallel parking and requires the initial state of the vehicle to be within a so-called feasible starting region from which pre-coded parallel parking maneuvers are initiated. Although achieving real-time path generation, those methods rely on a specific structure of the parking path.

To accommodate general parking path, one method described in U.S. Pat. No. 9,140,553 uses a two-staged automatic parking system that calculates and remembers the parking path during a learning mode when a vehicle is manually parked by a driver, and later assists parking the vehicle along the leaned parking path during an auto-parking mode. This method can assist parking in specified spaces, such as residential garages, along the arbitrarily but previously learned parking path. That method considers the deviation from that parking path as an erratic course that needs to be prevented. Such a rationale is not always desirable.

SUMMARY

It is an object of some embodiments to disclose a path planning method for the vehicle automated parking system and method. It is another object of some embodiments to provide such a method that reduces the computational cost of the path planning caused by specifics of the automatic parking for variety of real-life parking scenarios.

Some embodiments are based on understanding that two-staged automatic parking can facilitate automatic parking for variety of parking situations. The two-staged automatic parking includes a learning stage and an auto-parking stage. In the learning stage, the driver parks the vehicle, e.g., by manual control, and learning methods are performed to observe and memorize reference data indicative of the parking path leading from the initial location to the location of the target parking space while avoiding structures of the surrounding environment.

In the auto-parking stage, the vehicle is automatically parked, and the self-localization of the vehicle and path planning to the target parking space are performed sequentially and iteratively by matching the current sensor observations with the reference data memorized in the learning stage. In particular, geometric features of objects and relative spatial relationships among objects in the images of the parking space are matched as observations for the self-localization.

When the parking paths during the learning stage and auto-parking stage are similar, the comparison of different images of the parking space allows for the self-localization. In general, however, characteristics of image-based 2D features including geometric features and spatial relationships among objects depend on the observation view of the camera acquiring the image. For example, a rectangle shape such as a window frame of a building appears as a rectangle in the image captured from the front view, while appears as a trapezoid (distorted rectangle) in the image captured from the oblique view.

This problem is referred herein as the large-baseline matching problem rooted in the automatic self-localization utilized by two-staged parking. Specifically, a landmark, i.e., a distinctive feature extracted from an image, observed from two spaced apart views can be missed by the automatic self-localization matching process, because the appearances of the same landmark viewed from different viewpoints can change significantly.

Therefore, it is essentially difficult to match image-based 2D features correctly among images captured from different observation views and image-based 2D feature matching can fail when the observation views in the learning stage are different from those in the auto-parking stage. The failure of the feature matching can result in the failure of self-localization and the failure of the automatic parking. Such a dependency on appearance invariance of different features in the images of the parking space limits the usability or application range of the automatic parking because drivers are required to locate their vehicle near the path taken in the learning mode before starting the auto-parking mode, that is, the drivers cannot use the auto-parking mode if the vehicle is located away from the path. However, some embodiments are based on general recognition that it is beneficial to reuse the data learned during the learning stage for auto-parking the vehicle along different parking paths.

Some embodiments are based on realization that virtual images can help to circumvent such a dependency of the automatic self-localization on appearance invariance. For example, it is possible to synthesize some new virtual images from new viewpoints that might be visited in the future. For example, it is possible to transform the images captured by the camera pointing from a location A towards a location B into a virtual image as viewed from a virtual viewpoint pointing from the location B towards the location A. The virtual image can be used for comparison with newly taken image by the camera pointing from the location B to the location A to circumvent the large-baseline matching problem.

To that end, some embodiments first generate a 3D model of the surrounding environment from images acquired while a vehicle is parked along a first parking path, and then set virtual viewpoints in the 3D model. As used herein, a virtual viewpoint is a virtual point of a pose of a camera acquiring a virtual image. For example, a virtual image can be generated by re-projecting the 3D model data to virtual image plane at the virtual observation point.

The virtual viewpoints are set so that their observation views differ from those of original viewpoints in the learning mode. Then, a set of virtual images is generated for a set of virtual observation points. Finally, image features are extracted from both of original and virtual images and memorized in the system as reference data used for the auto-parking stage.

Considering the virtual images from the 3D model, the reference data can contain the features from real and virtual images forming a variety of observation views. This enrichment of the bank of the features enables the system to succeed in the feature matching followed by self-localization in the auto-parking mode, even when the vehicle is located away from the path taken in the learning mode. Consequently, some embodiments can improve the usability and the range of application of the automatic parking system.

Accordingly, one embodiment discloses a method for parking a vehicle within a parking space. The method uses a processor operatively connected to a memory, at least one sensor for acquiring images indicative of environment of at least part of the parking space, and a controller for controlling motion of the vehicle, wherein the processor is coupled with stored instructions implementing the method, wherein the instructions, when executed by the processor carry out at least some steps of the method, including controlling motion of the vehicle according to a first parking path ending at a target state, each state of the vehicle includes a position and orientation of the vehicle; acquiring a set of images of the parking space during the motion of the vehicle along the first parking path, such that each image in the set of images is acquired from a viewpoint defined by a state of the vehicle along the first parking path; constructing a model of the parking space using the set of images; selecting a set of virtual viewpoints outside of the first parking path including at least one virtual viewpoint defining a state of the vehicle outside of the first parking path; generating, using the model of the parking space, a set of virtual images of the environment of the parking space as viewed from the set of virtual viewpoints; determining a current state of the vehicle by comparing a current image of the parking space acquired by the sensor while the vehicle is in the current state with at least one virtual image; determining, using the model of the vehicle, a second parking path from the current state to the target state; and controlling the motion of the vehicle according to the second parking path.

Another embodiment discloses a system for parking a vehicle within a parking space. The system includes a memory for storing a model of the vehicle; at least one sensor for sensing information indicative of environment of at least part of the parking space; a controller for controlling motion of the vehicle according to different trajectories including a first parking path and a second parking path ending at a target state, and each state of the vehicle is defined by a position and orientation of the vehicle; and at least one processor configured for acquiring a set of images of environment of the parking space during the motion of the vehicle along the first parking path, such that each image in the set of images is acquired from a viewpoint defined by a state of the vehicle along the first parking path; constructing a model of the parking space using the set of images; selecting a set of virtual viewpoints outside of the first parking path including at least one virtual viewpoint defining a state of the vehicle outside of the first parking path; generating, using the model of the parking space, a set of virtual images of the environment of the parking space as viewed from the set of virtual viewpoints; determining a current state of the vehicle by comparing a current image of the parking space acquired by the sensor while the vehicle is in the current state with at least one virtual image; and determining the second parking path from the current state to the target state using the model of the vehicle.

Yet another embodiment discloses a non-transitory computer readable storage medium embodied thereon a program executable by a processor for performing a method for parking a vehicle within a parking space. The method includes controlling motion of the vehicle according to a first parking path ending at a target state, each state of the vehicle includes a position and orientation of the vehicle acquiring a set of images of the parking space during the motion of the vehicle along the first parking path, such that each image in the set of images is acquired from a viewpoint defined by a state of the vehicle along the first parking path; constructing a model of the parking space using the set of images; selecting a set of virtual viewpoints outside of the first parking path including at least one virtual viewpoint defining a state of the vehicle outside of the first parking path; generating, using the model of the parking space, a set of virtual images of the environment of the parking space as viewed from the set of virtual viewpoints; determining a current state of the vehicle by comparing a current image of the parking space acquired by the sensor while the vehicle is in the current state with at least one virtual image; determining, using the model of the vehicle, a second parking path from the current state to the target state; and controlling the motion of the vehicle according to the second parking path.

BRIEF DESCRIPTION OF THE DRAWINGS

FIG. 10 shows a block diagram of function modules used in the learning mode by some embodiments;

DETAILED DESCRIPTION

Figure 1:
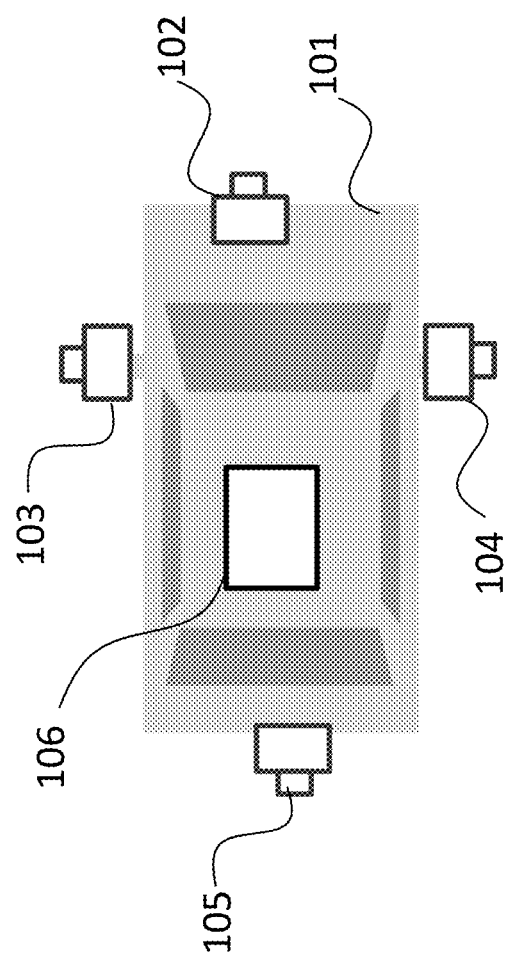
FIG. 1 shows a schematic of a vehicle utilizing an automatic parking using principles of some embodiments.

FIG. 1 shows a schematic of a vehicle utilizing an automatic parking using principles of some embodiments. A vehicle 101 includes at least one sensor for sensing information indicative of environment of at least part of the parking space, a controller for controlling motion of the vehicle, and at least one processor for determining various trajectories of the vehicle. For example, the vehicle 101 can include surrounding cameras 102-105, and an automatic parking system 106 implemented using the processor. In this example, the front camera 102 is set on the front bumper to observe the front area of the vehicle 101. The left camera 103 and the right camera 104 are set under the side mirrors so to observe the left and right side areas. The rear camera 105 is set on the rear door to observe the rear area. Each camera is connected to the automatic parking system 106. In some implementations, each camera has wide angle of view and calibrated in advance, and the whole observation area of a set of cameras covers the surrounding area of the vehicle 101. As should be understood, different embodiments can use different number, type, and locations of the cameras.

The automatic parking system 106 has two operation stages and/or modes, a learning mode and an auto-parking mode. In the learning mode, the driver controls the vehicle and parks the vehicle in a target parking space, while the system obtains observations of the surrounding environment from a set of cameras and memorizes a set of processed data of the observations as reference data. In the auto-parking mode, the vehicle is automatically controlled and parked in the target parking space by the system. During the automatic parking, self-localization of the vehicle and path-planning to the target parking space are performed by matching input observations from a set of cameras to the observations of reference data.

Figure 2:
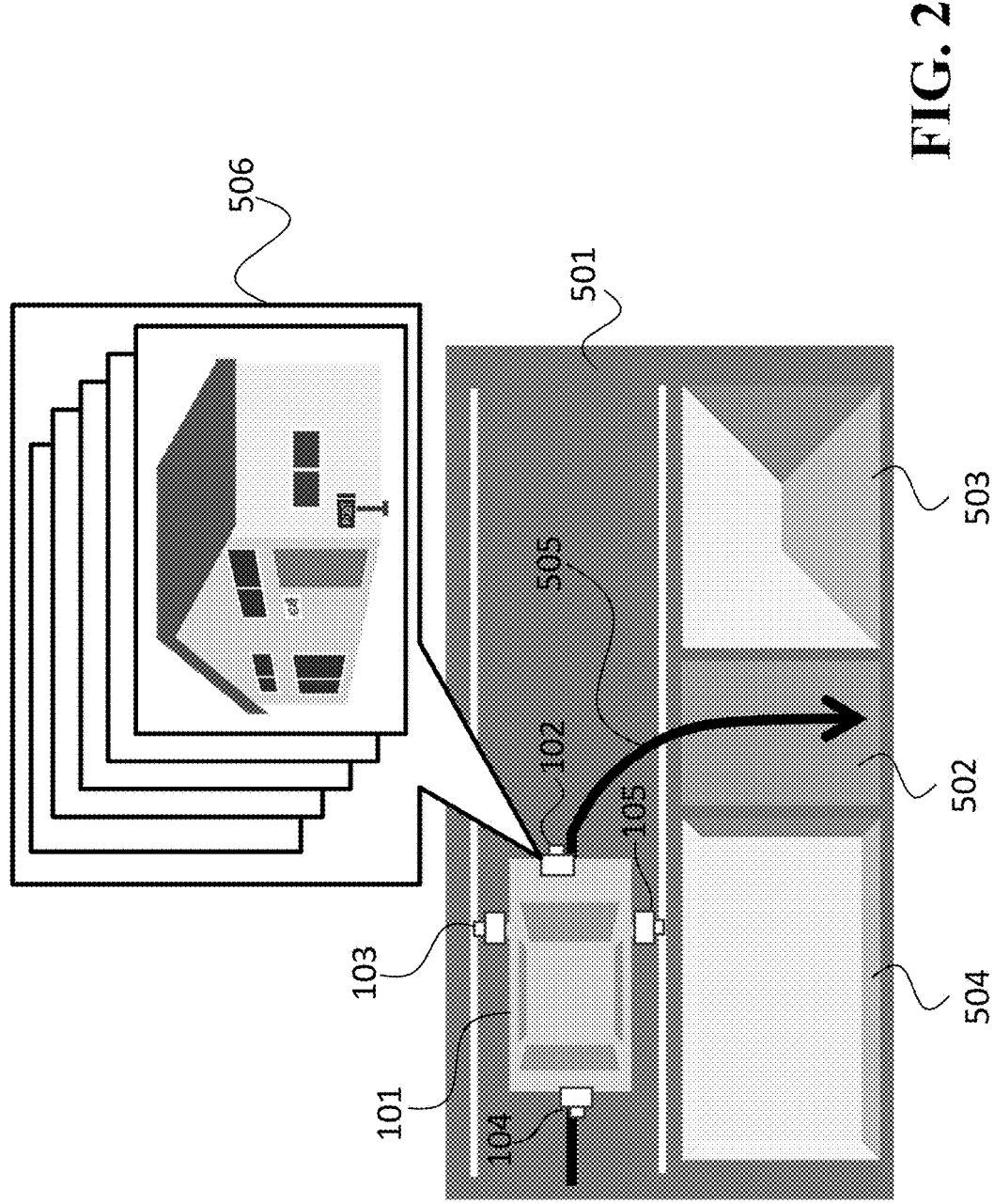
FIG. 2 shows a schematic of exemplar parking during a learning stage along a first parking path according to some embodiments.

FIG. 2 shows a schematic of exemplar parking during a learning stage along a first parking path according to some embodiments. For example, the vehicle 101 is parked along a first parking path 505 into a target state 502. As used herein, each state of the vehicle includes a position and orientation of the vehicle. For example, the target state can include a position and orientation of the vehicle in a designated parking spot free from the obstacles, such as structures 503 and 504. In some embodiments, the position has three degrees-of-freedom (3-DOF), e.g., (x, y, z) coordinates in a 3D space, and the orientation has 3-DOF, e.g., (roll, pitch, yaw) angles, thus the state has a total of 6-DOF. In some other embodiments, the state can be represented as 3-DOF, with a 2-DOF position, e.g., (x, y) coordinates on a 2D plane, and a 1-DOF orientation, e.g., yaw angle corresponding to an in-plane rotation. The 3-DOF state representation is advantageous in terms of computational costs and memory consumptions, and can be used if the parking space has a planar road surface and the vehicle moves on the planar road surface, where the state can be defined with respect to the planar road surface.

The motion according to a first parking path ending at the target state 502 can be controlled manually, e.g., using input control commands from a driver of the vehicle, automatically, e.g., using an automatic parking system, or combination thereof. During the motion of the vehicle along the first parking path, the vehicle acquires a set of images 506 of the parking space using cameras 102-105. Each image in the set of images 506 is acquired from a viewpoint defined by a state of the vehicle along the first parking path. For example, at any state of the vehicle 101 on the path 505, the image taken by the camera 103 is different from an image taken by the camera 105. However, both images and both viewpoints of the cameras 103 and 105 are unambiguously defined by the state and geometry of the vehicle as well as the arrangement of the cameras on the vehicle.

Figure 3A:
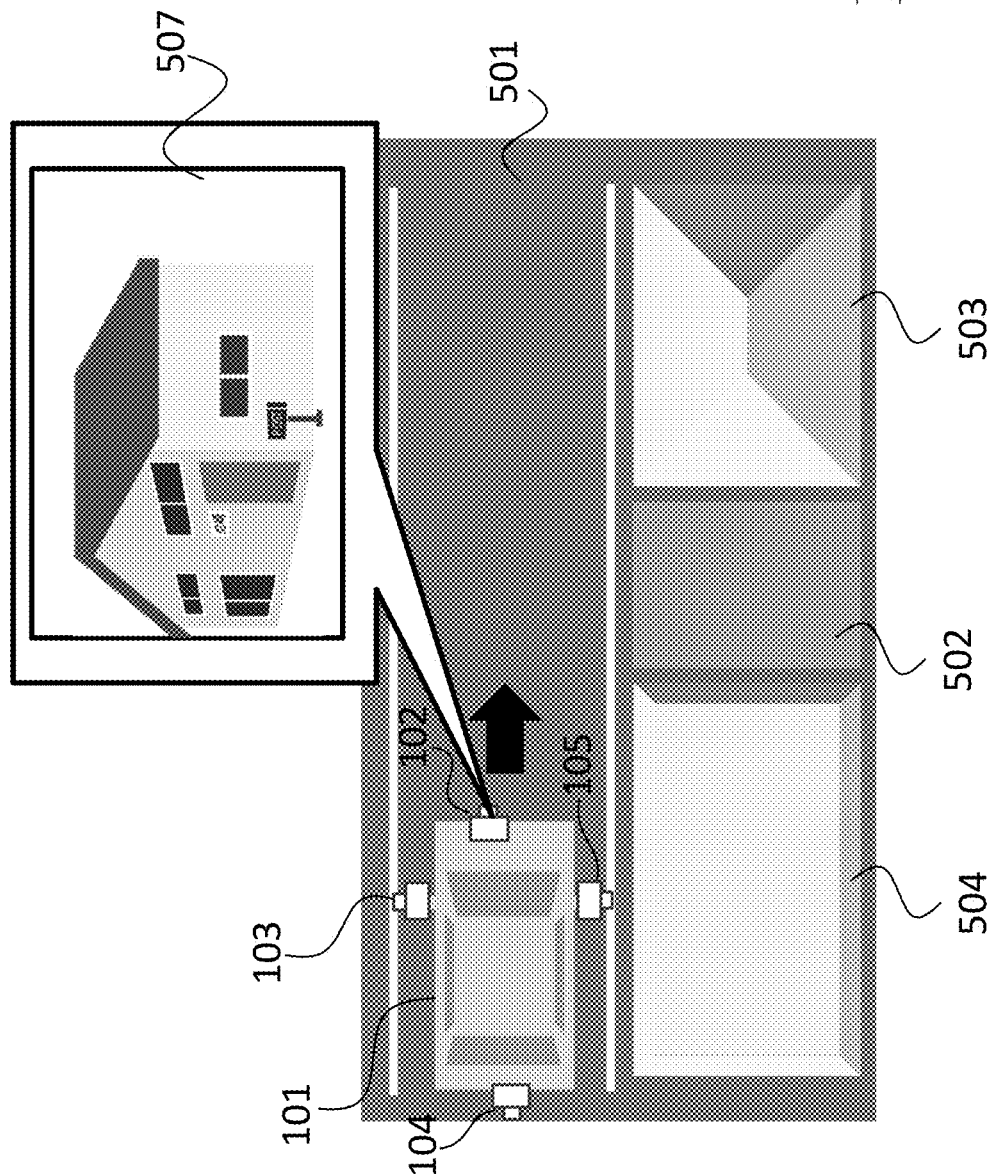
FIG. 3A shows a schematic of exemplar parking during an auto-parking stage along the first parking path according to some embodiments.
Figure 3B:
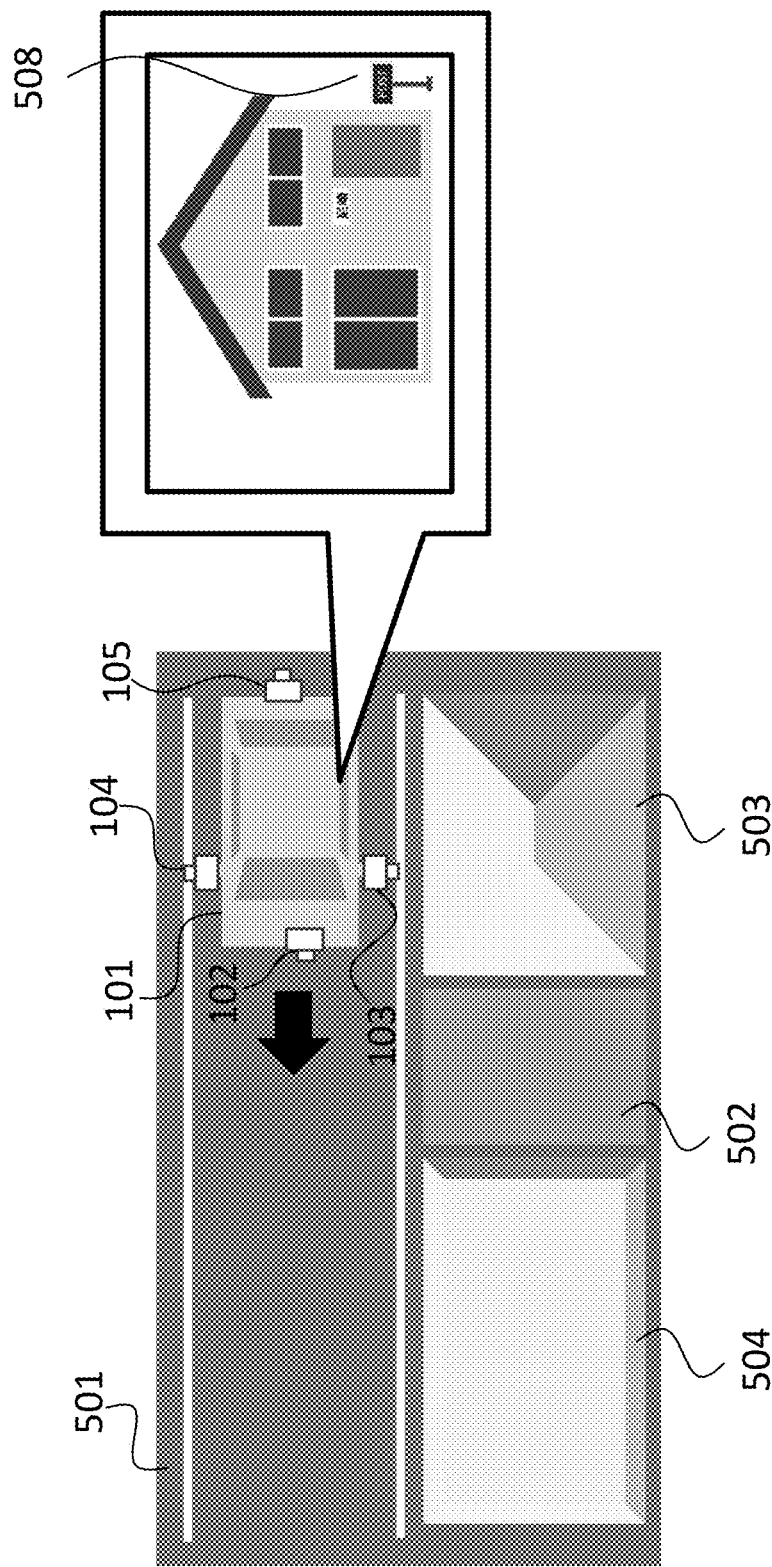
FIG. 3B shows a schematic of exemplar parking during an auto-parking stage along a second parking path that is different from the first parking path according to some embodiments.

FIG. 3A shows a schematic of exemplar parking during an auto-parking stage along the first parking path according to some embodiments. FIG. 3B shows a schematic of exemplar parking during an auto-parking stage along a second parking path that is different from the first parking path according to some embodiments. Specifically, in the example shown in FIG. 3A the vehicle follows the similar path with the path 505. In the scenario shown in FIG. 3B the vehicle takes different path and approaches the target parking space from the opposite side of the start point of the path 505.

To that end, the image 507 in FIG. 3A and the image 508 in FIG. 3B represent captured image examples in which a whole appearance of the building 503 is observed in each of the images. Note that the building 503 is observed from the oblique view in image 507 and is observed from the front view in image 508, while no images include the observation of the building 503 from front view in a set of images 506 in FIG. 2.

When the parking paths during the learning stage and auto-parking stage are similar, as in the example shown in FIG. 3A, the comparison of different images of the parking space allows for the self-localization. However, when the parking paths during the learning stage and auto-parking stage are different, as in the example shown in FIG. 3B, the comparison of different images of the parking space can fail.

Some embodiments are based on recognition that it is beneficial to reuse the data learned during the learning stage for auto-parking the vehicle along different parking paths. For example, it can be beneficial to reuse the data learned while moving along the first parking path to park the vehicle along the second, i.e., different, parking path. Some embodiments are based on realization that virtual images can help to circumvent such a dependency of the automatic self-localization on appearance invariance. For example, it is possible to synthesize some new virtual images from new viewpoints that might be visited in the future.

To that end, some embodiments generate a 3D model of the surrounding environment from images acquired by the cameras, and then set virtual viewpoints in the 3D model. As used herein, a virtual viewpoint is a virtual point of a pose of a camera acquiring a virtual image. For example, a virtual image can be generated by re-projecting the 3D model data to virtual image plane at the virtual observation point.

The virtual viewpoints are set to differ from the viewpoints used to acquire images in the learning mode. Then, a set of virtual images is generated for a set of virtual viewpoints. Finally, image features are extracted from both of original and virtual images and memorized in the system as reference data used for self-localization and automatic parking.

Figure 4:
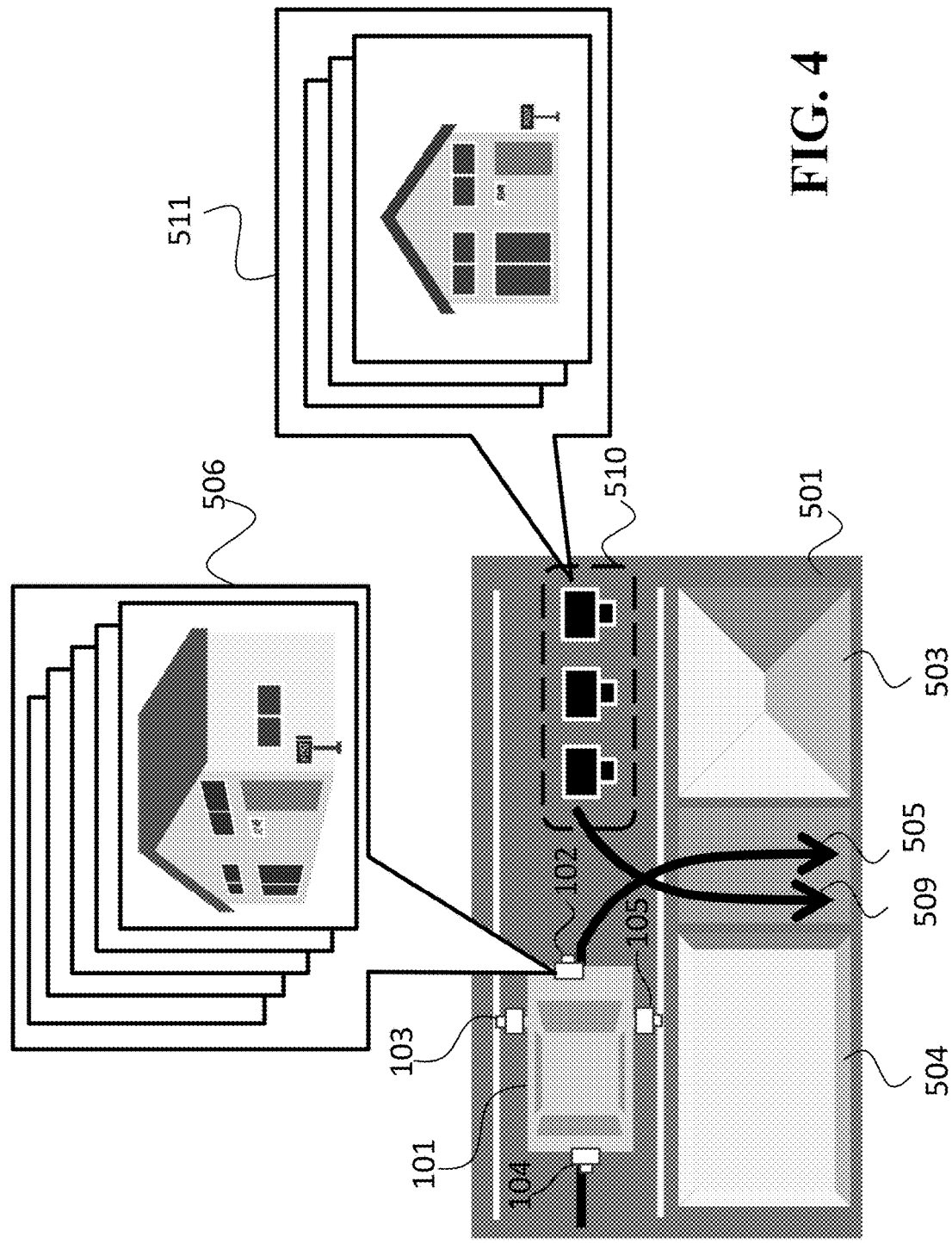
FIG. 4 shows an example of parking scenario using principles employed by some embodiments.

FIG. 4 shows an example of parking scenario using principles employed by some embodiments. In FIG. 4, examples of the virtual observation points 510 and corresponding virtual images 511 are illustrated. In this example, the virtual images 511 include a whole appearance of the building 503 from the front view. In this case, even though the first 505 and the second 509 parking paths of the vehicle are different between two modes, the feature matching followed by self-localization in the auto-parking mode can succeed because the reference data in the learning mode includes image features from virtual images 511 that are similar to the features of the images acquired by a camera of the vehicle following the second parking path 509.

Figure 5:
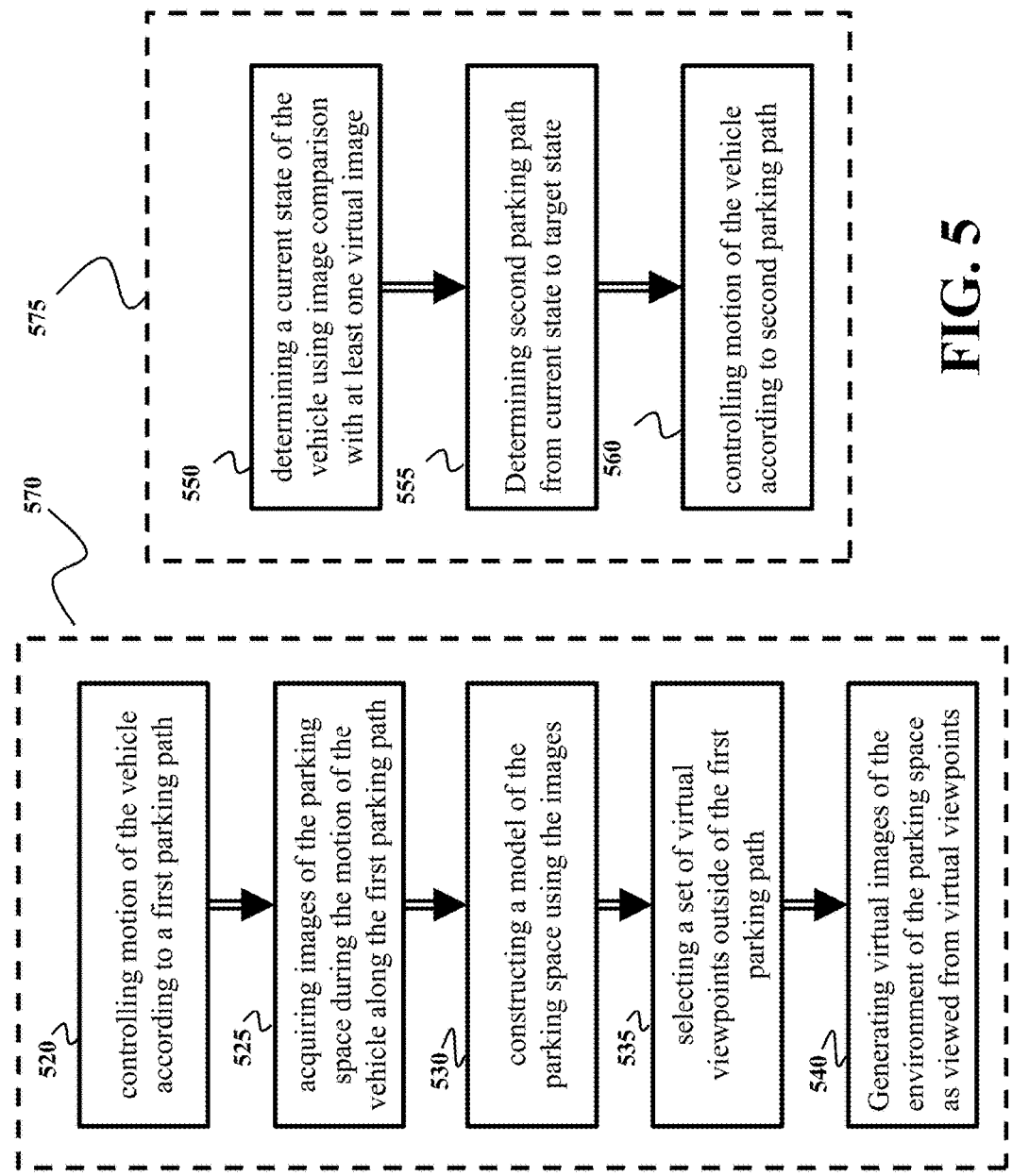
FIG. 5 shows a block diagram of a method for parking a vehicle within a parking space according to some embodiments.

FIG. 5 shows a block diagram of a method for parking a vehicle within a parking space according to some embodiments. The method uses a processor operatively connected to a memory, at least one sensor for acquiring images indicative of environment of at least part of the parking space, and a controller for controlling motion of the vehicle. The processor is coupled with stored instructions implementing the method, wherein the instructions, when executed by the processor carry out at least some steps of the method.

The method controls 520 motion of the vehicle according to a first parking path ending at a target state and acquires 525 a set of images of the parking space during the motion of the vehicle along the first parking path. For example, the first parking path can be the path 505 and the images of the parking space are acquired using the cameras 102-105, such that each image in the set of images is acquired from a viewpoint defined by a state of the vehicle along the first parking path.

The method constructs 530 a model of the parking space using the set of images, selects 535 a set of virtual viewpoints outside of the first parking path and generates 540, using the model of the parking space, a set of virtual images of the environment of the parking space as viewed from the set of virtual viewpoints. As referred herein, the set of virtual viewpoints includes at least one virtual viewpoint defining a state of the vehicle outside of the first parking path.

In some embodiments, the above-mentioned steps are performed during a learning stage 570 of the method. The features of the real and virtual images are stored for self-localization of the auto-parking stage 575 of the method. It should be understood, however, that the paths determined during the auto-parking stage 575 can serve to learn and update the model of the parking space for subsequent parking.

During the auto-parking stage 575, the method determines 550 a current state of the vehicle by comparing a current image of the parking space acquired by the sensor while the vehicle is in the current state with at least one virtual image. Comparison with the virtual images, e.g. geometrical features of the virtual images, allows for self-localization of the vehicle outside of the first parking path. The method determines 555, e.g., using a model of the vehicle, a second parking path from the current state to the target state and controls 560 the motion of the vehicle according to the second parking path.

Figure 6A:
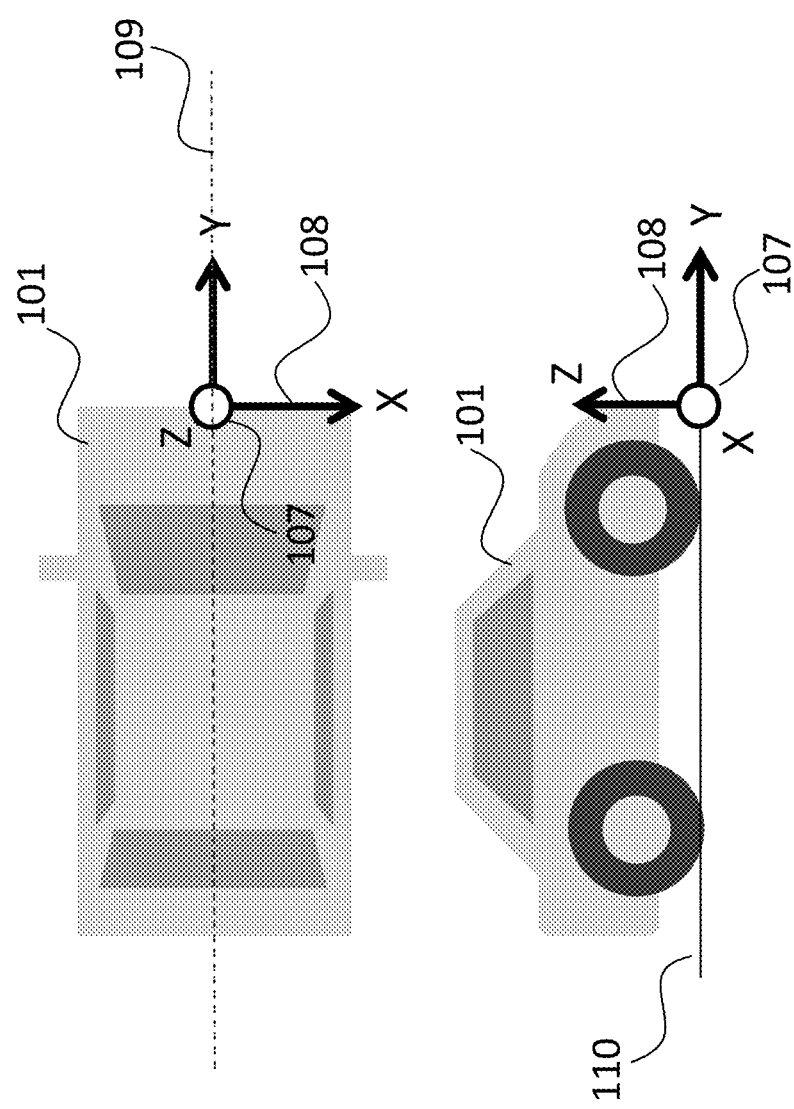
FIG. 6A illustrates an example of a vehicle coordinate system used by some embodiment.

FIG. 6A illustrates an example of a vehicle coordinate system used by some embodiment. The origin 107 of the vehicle coordinate system 108 is defined as a point at which a perpendicular line passing the vehicle center point intersects the ground plane 110. The perpendicular line is set as Z axis and Y axis is set so that it is parallel to the vehicle center line 109.

Figure 6B:
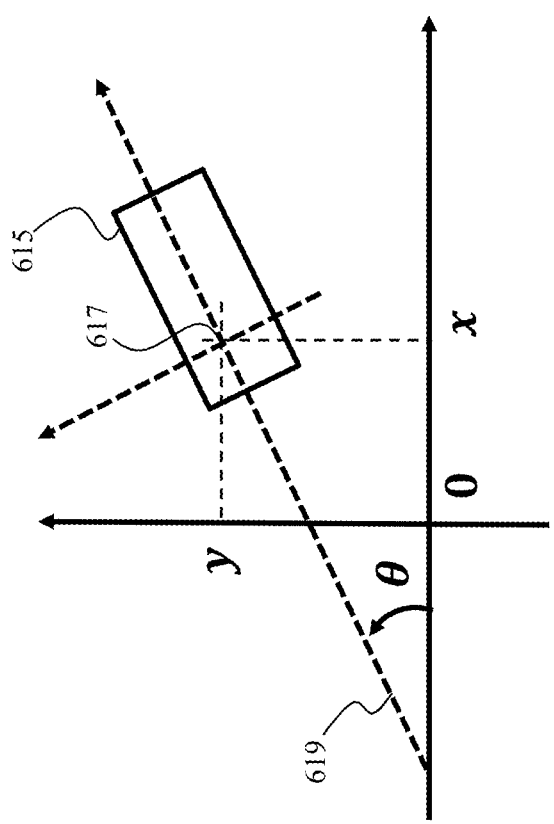
FIG. 6B shows an exemplar schematic of geometrical representation of a vehicle according to some embodiments.

FIG. 6B shows an exemplar schematic of geometrical representation of a vehicle according to some embodiments. In this example, the vehicle is abstracted as a rectangle 615. The vehicle state includes 3-DOF, the position (x, y) 617, which represents the midpoint of its rear wheel axis, and the orientation θ 619, which denotes the angle between the vehicle body axis and the horizontal axis.

Figure 7:
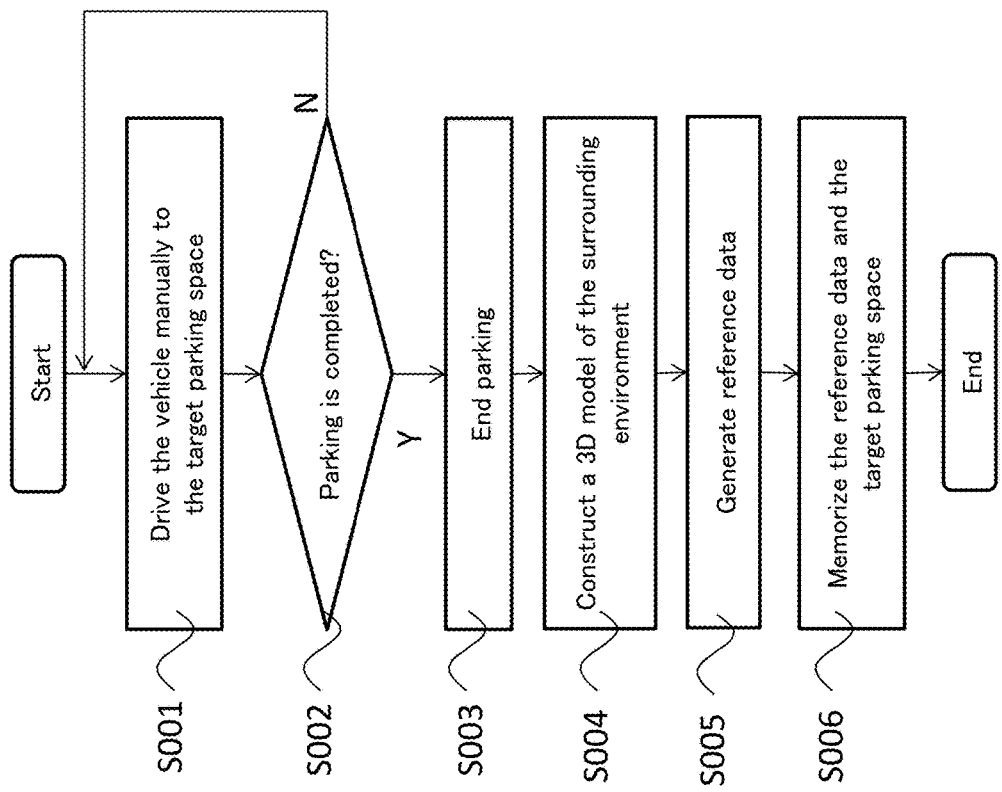
FIG. 7 shows a flow chart of the learning stage of the parking system according to one embodiment.

FIG. 7 shows a flow chart of the learning stage 570 according to one embodiment. First, the driver (user) locates the vehicle at a desired parking start location, and starts the learning mode (the starting signal is given by the driver). Then, the driver drives S001 the vehicle to park in the target parking space and judges S002 if the parking is completed. Once the driver judges that the parking is completed, the driver gives S003 a parking complete signal to the system. After that, the system constructs S004 a 3D model of the surrounding environment and generates S005 reference data from a set of captured images during the parking. Finally, the system memorizes S006 the reference data and information about the target parking space and ends the learning mode.

Figure 8:
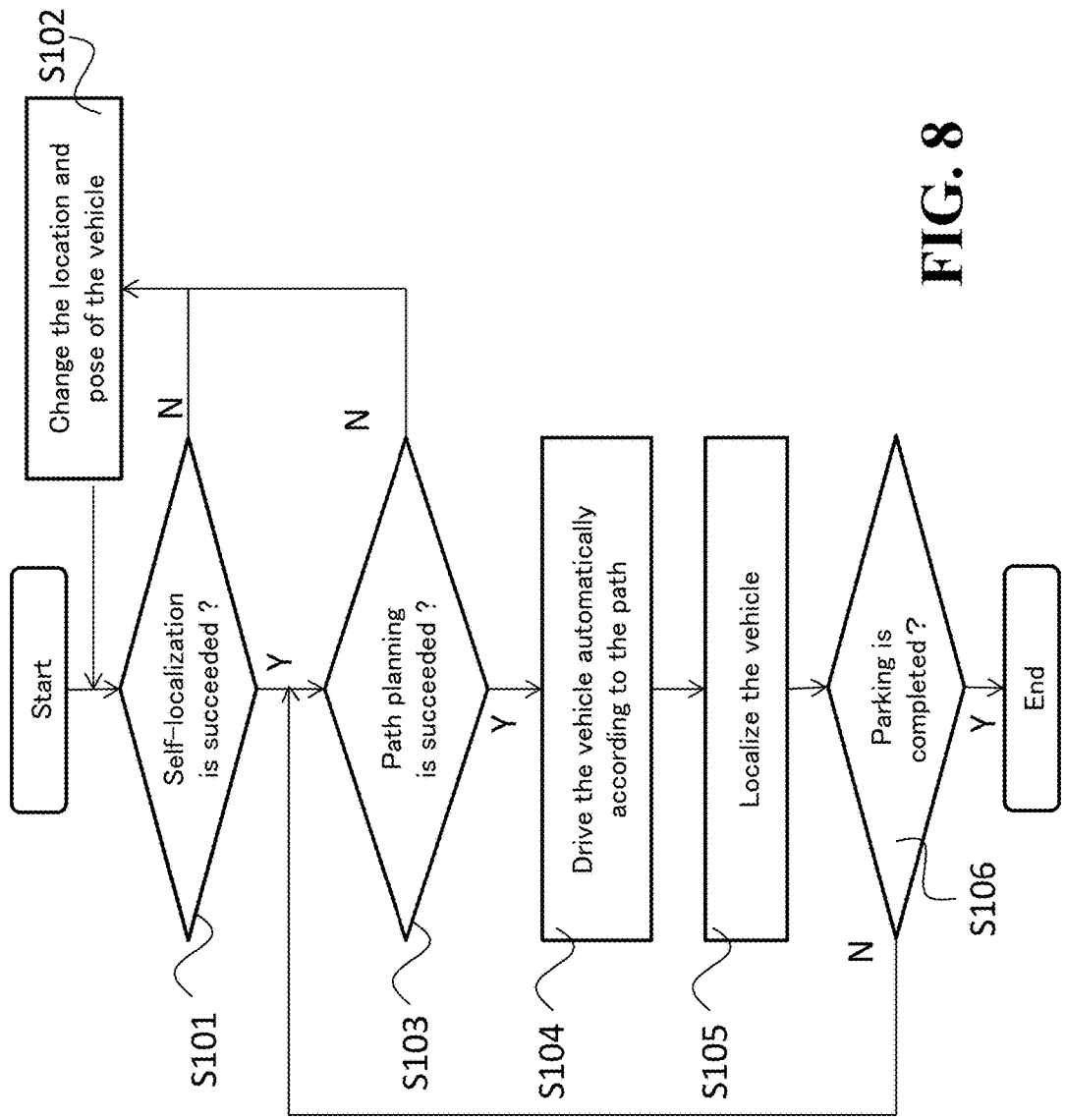
FIG. 8 shows a flow chart of the auto-parking stage of the parking system according to one embodiment.

FIG. 8 shows a flow chart of the auto-parking stage 575 according to one embodiment. First, the driver starts the auto-parking mode. At the initial vehicle location, the system localizes S101 the vehicle by matching current observations from a set of cameras to the reference data memorized in the learning mode. If the system fails in the localization, the vehicle is moved S102 to another location by the driver or by the system automatically. Steps S101 and S102 are iterated until the system succeeds in the initial localization. After the success of the initial localization, the system calculates S103 a path (route) from the current location to the target parking space. If the system fails in the path planning (calculation), the vehicle is moved as above (S102) until the system succeeds in the path planning. Once the path planning is succeeded, the system controls and drives S104 the vehicle along the planned path, and then localizes S105 again. In S105, the localization is performed by observation matching as described above or alternatively, performed by Dead-Reckoning based on vehicle control information such as yaw-rate and speed. After that, the system judges S106 whether the parking is completed. If the parking is not completed, a series of steps (S103 to S105) is iterated. If the parking is completed, the system ends the auto-parking mode.

Figure 9A:
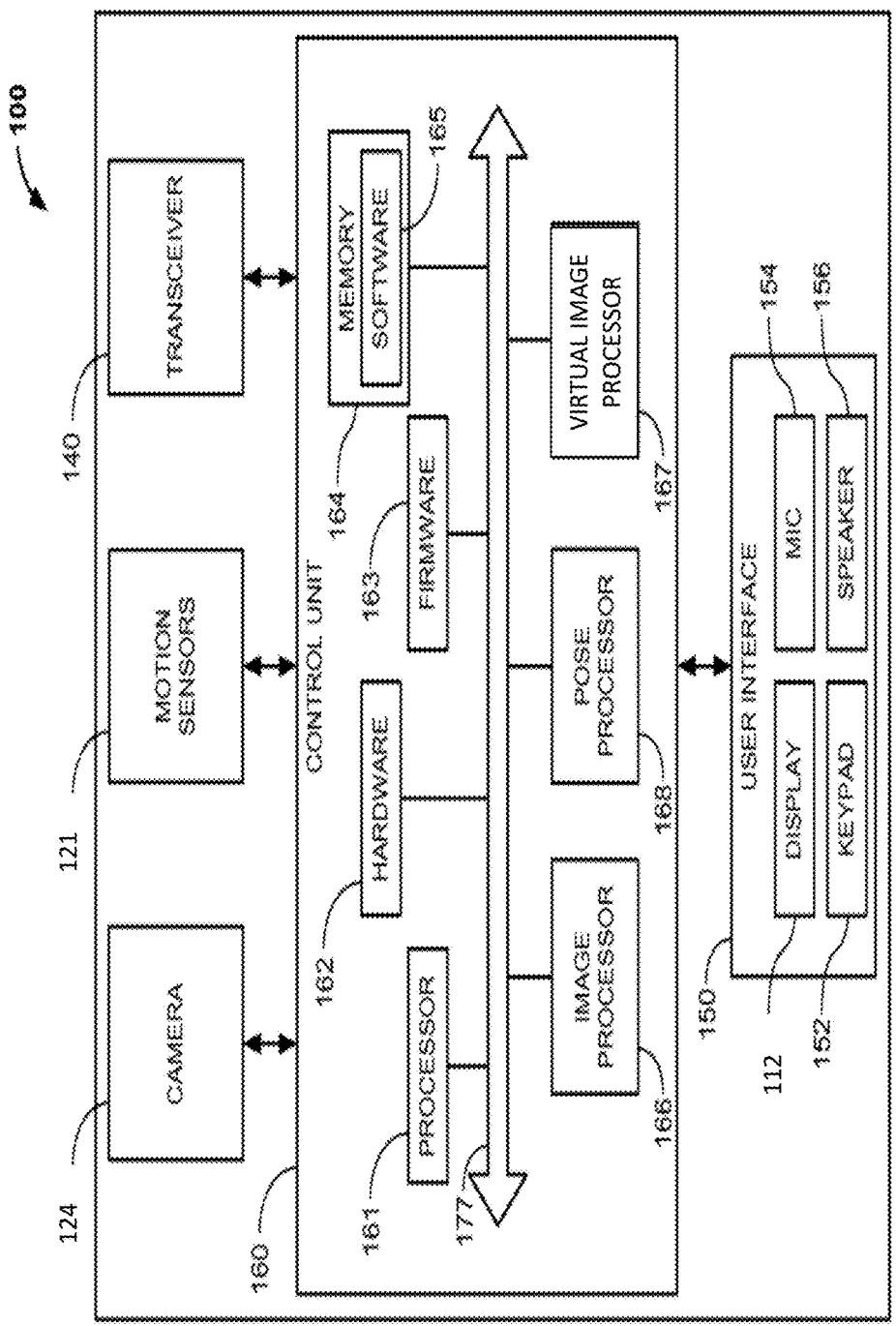
FIG. 9A shows a block diagram of a system suitable for an automatic parking according to some embodiment.

FIG. 9A shows a block diagram of a system 100 suitable for an automatic parking according to some embodiment. The system 100 can include a general purpose processor 161 and a memory 164. Additionally, or alternatively, the system 100 can include special purpose processors, such as an image processor 166, a pose processor 168, and a virtual image processor 167. The device 100 can also include a number of sensors coupled to one or more buses 177 or signal lines further coupled to at least one of the processors 161, 166, 167, and 168. The system 100 can be part of the vehicle 101 and can be used to implement functionality of the automatic parking system 106.

The system 100 can include sensors for capturing an image of a scene, such as cameras 124, 3D sensors, and/or combinations of cameras and 3D sensors, referred to as red-green-blue-depth (RGBD) sensors (not shown) and may optionally include motion sensors 121, such as accelerometers, gyroscopes, electronic compass, or other similar motion sensing elements. The system 100 can also capture images on a front and/or rear-facing camera (e.g., cameras 124). The system 100 can further include a user interface 150 that includes one or combination of a display 112, an input device, such as a keyboard and keypad 152. If desired, integrating a virtual keypad into the display 122 with a touch screen/sensor may obviate the keyboard or keypad 152. The user interface 150 can also include a microphone 154 and speaker 156, e.g., if the device 100 is a mobile platform such as a cellular telephone. In some implementations, the system 100 can function as a mobile or wireless device and can communicate via one or more wireless communication links using a transceiver 140.

In one or more exemplary embodiments, the functions or modules described may be implemented in hardware (e.g., hardware 162), software (e.g., software 165), firmware (e.g., firmware 163), or any combination thereof of a controller 160. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 9B:
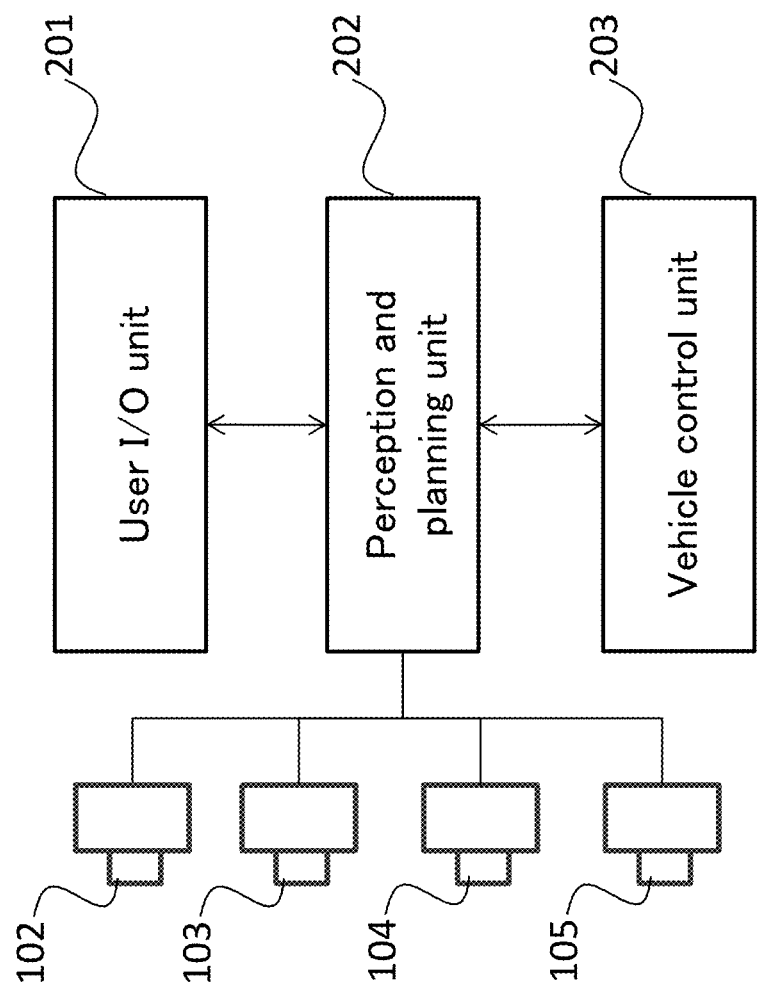
FIG. 9B shows a representation of the functional components of the automatic parking system according to one embodiment.

FIG. 9B shows a representation of the functional components of the automatic parking system 106 according to one embodiment. The automatic parking system 106 is composed of three units, user input/output (I/O) unit 201, perception and planning unit 202, and vehicle control unit 203.

In the learning mode, the perception and planning unit 202 can construct of a 3D model as a 3D map which represents the surrounding environment of the parking space; determine virtual viewpoints in the 3D model; generate virtual images for virtual observation points. The unit 202 can also extract image features from originally captured images and virtual images, determine a target parking state; find a correspondence of 2D image position of each image feature to a 3D position in the 3D model, and facilitate memorization of image features and their 3D positions in the 3D model as a reference data and target parking space information in the 3D model. Besides, the unit 202 can output the 3D model and target parking space information to the user I/O unit 201. The user I/O unit 201 displays the progress, status, and results of the learning mode to the driver.

In the auto-parking mode, the perception and planning unit 202 can extract image features from captured images, match the current image features to the image features in the reference data memorized in the learning mode, and localize the vehicle with respect to the 3D model by the matching results. The unit 202 can also determine the path to the target parking space from the current vehicle location and output the planned path to the vehicle control unit 203. The vehicle control unit 203 controls the vehicle based on the path input from the unit 202.

FIG. 10 shows a block diagram of function modules used in the learning mode by some embodiments. The image capturing module 301 controls a set of cameras and captures images. The image memorization module 302 memorizes the captured images.

The 3D model generation module 303 generates a 3D model from captured images by 3D reconstruction techniques such as SFM (structure from motion) and VSLAM (visual simultaneous localization and mapping). In this context, we define a 3D model as a 3D point cloud in which each point is corresponded to its original image (2D) point. This means that each point in the point cloud has not only the 3D position in the 3D model but also original image position and color (RGB), intensity, and/or feature information. In some embodiments, the coordinate system of the point cloud is set according to the vehicle coordinate system at a certain vehicle location in the learning mode. For example, the vehicle coordinate system can be at the start location or the end location in the learning mode as the coordinate system of the 3D model.

Figure 11:
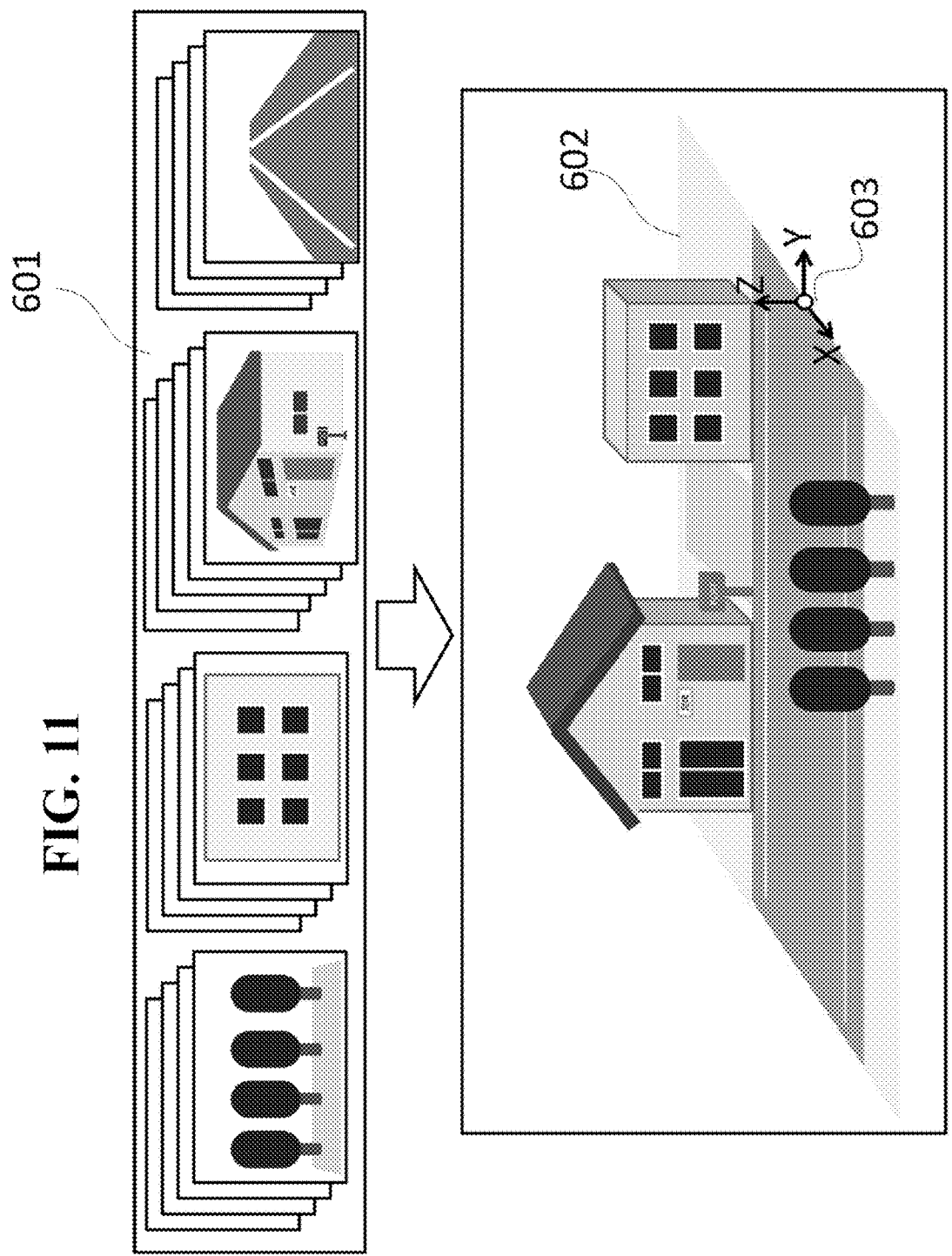
FIG. 11 illustrates an example of the 3D model of the parking space.

FIG. 11 illustrates an example of the 3D model. In FIG. 11, the 3D model 602 (assumed to have quite dense point cloud) with a coordinate system 603 is generated from a set of images 601 which are captured in the learning mode.

The target parking space determination module 304 determines a target parking space in the 3D model. The space at which the driver completes the parking in the learning mode is set as a target parking space and its location is represented in the 3D model. We can consider various representation forms. For example, it can be represented by the position and orientation of the vehicle coordinate system in the 3D model. Alternatively, it can be represented in the form of a 2D or 3D bounding box of the vehicle. The target parking space memorization module 305 memorizes the target parking space information.

The virtual observation point determination module 306 determines virtual viewpoints in the 3D model. In one embodiment, the virtual viewpoints are determined by randomly or regularly selecting points, e.g., states of the vehicle, in the 3D model. Next, a set of virtual cameras, e.g., four cameras matching cameras 102-105, is set for each virtual vehicle coordinate system based on the camera calibration data (relative position and orientation to the vehicle coordinate system). The origin of each virtual camera coordinate system can be regarded as a virtual observation point, and thus four virtual observation points can be determined by a set of virtual cameras at this point.

Figure 12:
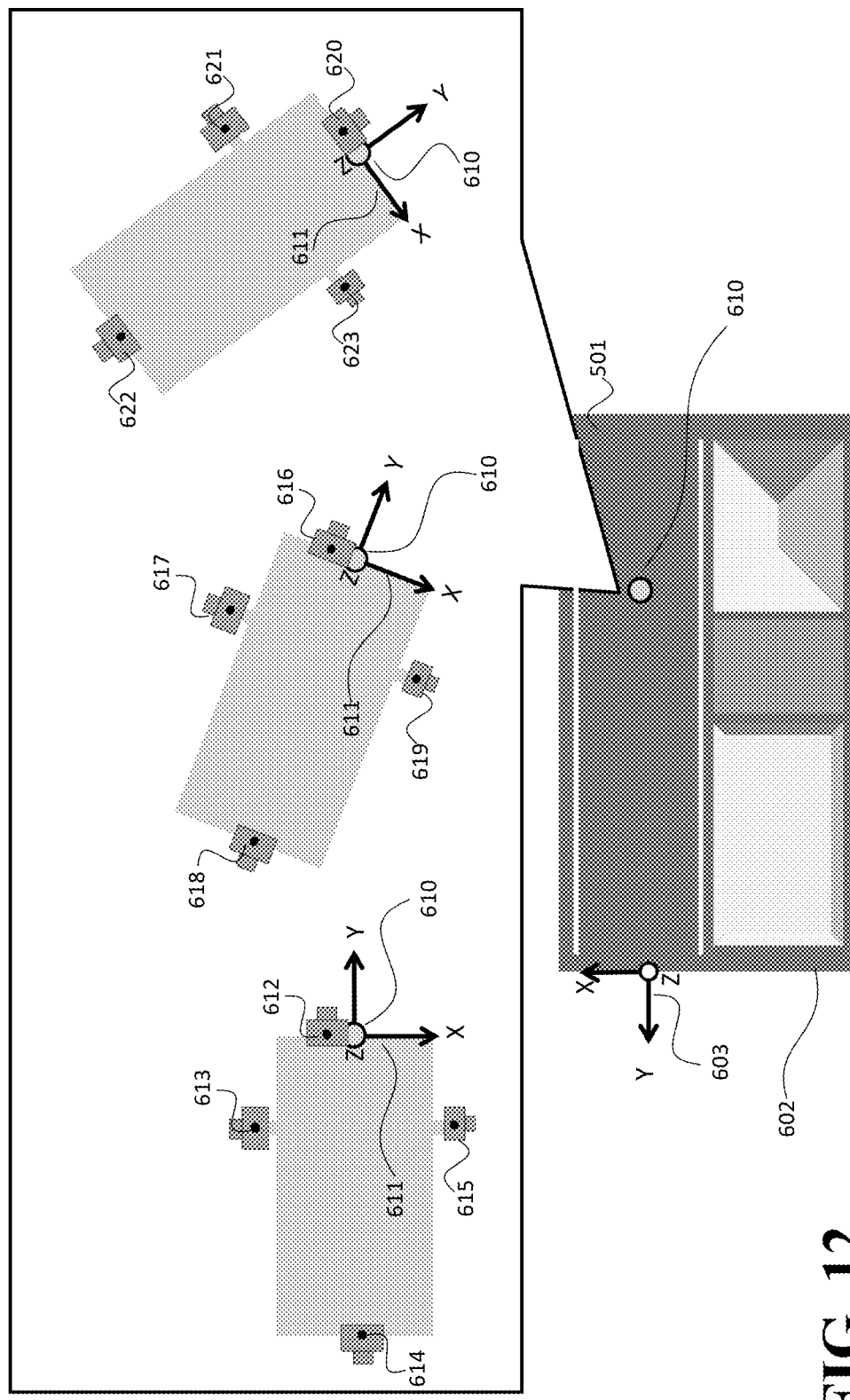
FIG. 12 shows examples of virtual states of the vehicle defining origins of the coordinate systems and corresponding virtual viewpoints.

FIG. 12 shows examples of virtual states 610 of the vehicle defining origins of the coordinate systems 611 and corresponding virtual observation points 612 through 623. In this figure, the map is shown in the form of top view (birds-eye) map of the 3D model 602 in FIG. 11.

The virtual image generation module 307 generates a set of virtual images with regard to virtual observation points. Different embodiments use different methods to generate a virtual frame given a virtual viewpoint. For example, the virtual images can be generated using one or combination of warping at least one image from the set of images, projecting the model of the scene into the virtual viewpoint, and a plane-induced homography.

For example, in one embodiment, the virtual viewpoint has a same viewing position as a real image while differs only in terms of orientation. In this embodiment, the virtual frame can be generated by warping every pixel $p_v$ in the new frame from the pixel $p_r$ in that real frame by $p_v = H p_r$, where $p_v$ and $p_r$ are 2D homogeneous coordinates of the pixels, H is a 3×3 homography matrix defined by $H = K_v R K_r^{-1}$, R is a 3D rotation matrix corresponding to the orientation of the virtual viewpoint with respect to the real viewpoint, and $K_v$ and $K_r$ are the 3×3 virtual and real camera intrinsic matrix respectively.

For example, in another embodiment, the virtual image can be directly generated from a dense point cloud describing the scene 602 reconstructed by the 3D model generation module 303. For example, in one implementation, a textured mesh model of this scene can be created from the dense point cloud. Then this textured mesh is submitted to a graphics pipeline such as OpenGL, with the virtual camera's pose (i.e., model-view matrix in OpenGL's term) set to the given virtual viewpoint, and its projection matrix is set by a desired camera intrinsic matrix, usually identical or close to that of the real camera. At this point, the RGB information is extracted from the color buffer of the OpenGL pipeline and depth information from the depth buffer. Thus a virtual frame of RGBD image is generated at the desired virtual viewpoint.

In yet another embodiment, when the 3D point cloud of the scene is relatively sparse, the virtual images are generated using plane-induced homography. For this case, it is difficult to generate the virtual image from a faraway virtual viewpoint for every pixel in the image, since we often lack per-pixel 3D information. Instead of generating a dense virtual image like the previous two cases, some embodiments can generate a sparse virtual image focusing on pixel locations with previously estimated 3D information, i.e., all feature points in the real images. This generation process can be done through image-based warping using plane-induced homography, explained as follows. Assuming a feature point's corresponding landmark is locally a small plane ($n_w$, $d_w$), where $n_w$ is the plane's normal direction in a world coordinate system, and $d_w$ is the world origin's distance to the plane. If this feature point was previously observed in a real frame whose pose in the world is $T_r \triangleq (R_r, t_r; 0, 1)$, where $R_r$ and $t_r$ are the real camera's 3D rotation matrix and translation vector respectively, and the given virtual viewpoint's pose is $T_v \triangleq (R_v, t_v; 0, 1)$, where $R_v$ and $t_v$ are the virtual camera's 3D rotation matrix and translation vector respectively, then from the multiple view geometry theory, a homography matrix between the real frame and the virtual frame induced by observing the same local plane can be found as $$H \triangleq K_v (R - t n^T d^{-1}) K_r^{-1},$$

where $(R, t; 0, 1) = T_v^{-1} T_r$, $n = R_r^T n_w$, $d = n_w^T t_r + d_w$, and $K_v$ and $K_r$ are the 3×3 virtual and real camera intrinsic matrix respectively.

This homography matrix can be used to warp this feature point and its neighboring pixels as a patch on the real image to a patch on the virtual image. This warped patch represents what is expected to be observed if a real camera observes the corresponding landmark from the virtual pose $T_v$. By repeating this warping operation for each feature point on the real image, a virtual image with sparse features is generated.

Figure 13:
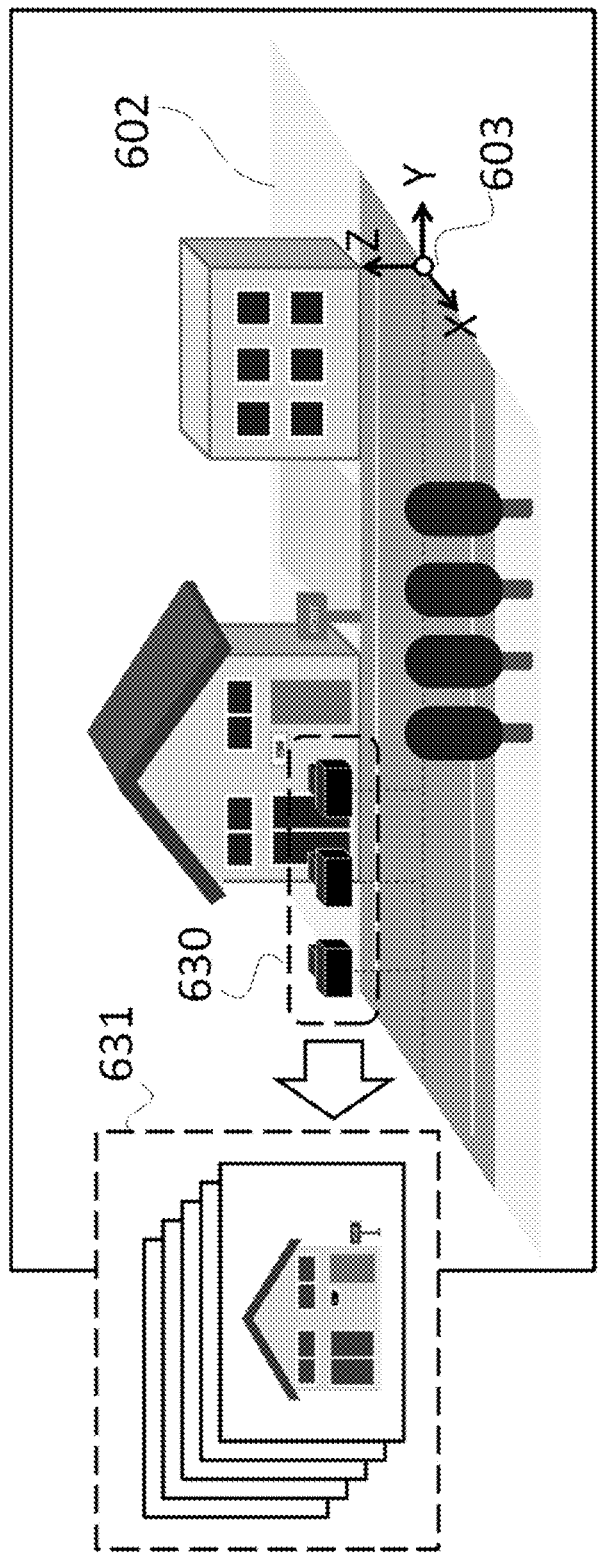
FIG. 13 shows an illustration of exemplar virtual images generated with regard to a set of virtual viewpoints according to some embodiments.

FIG. 13 shows an illustration of exemplar virtual images 631 generated with regard to a set of virtual viewpoints 630 in the 3D model 602 according to some embodiments. In this example, the geometric structures of objects (e.g., building and house) in the scene are not distorted in the virtual images, since the virtual images are generated via the 3D model.

The image feature extraction module 308 extracts image features. For example, corner points are detected in an image, and then local features of each corner point (e.g., SIFT, SURF, and so on) are calculated.

The reference data generation module 309 corresponds each image feature (extracted in the module 308) to a 3D position in the 3D model. A pair of image feature and corresponded 3D position is defined as a reference data.

Figure 14:
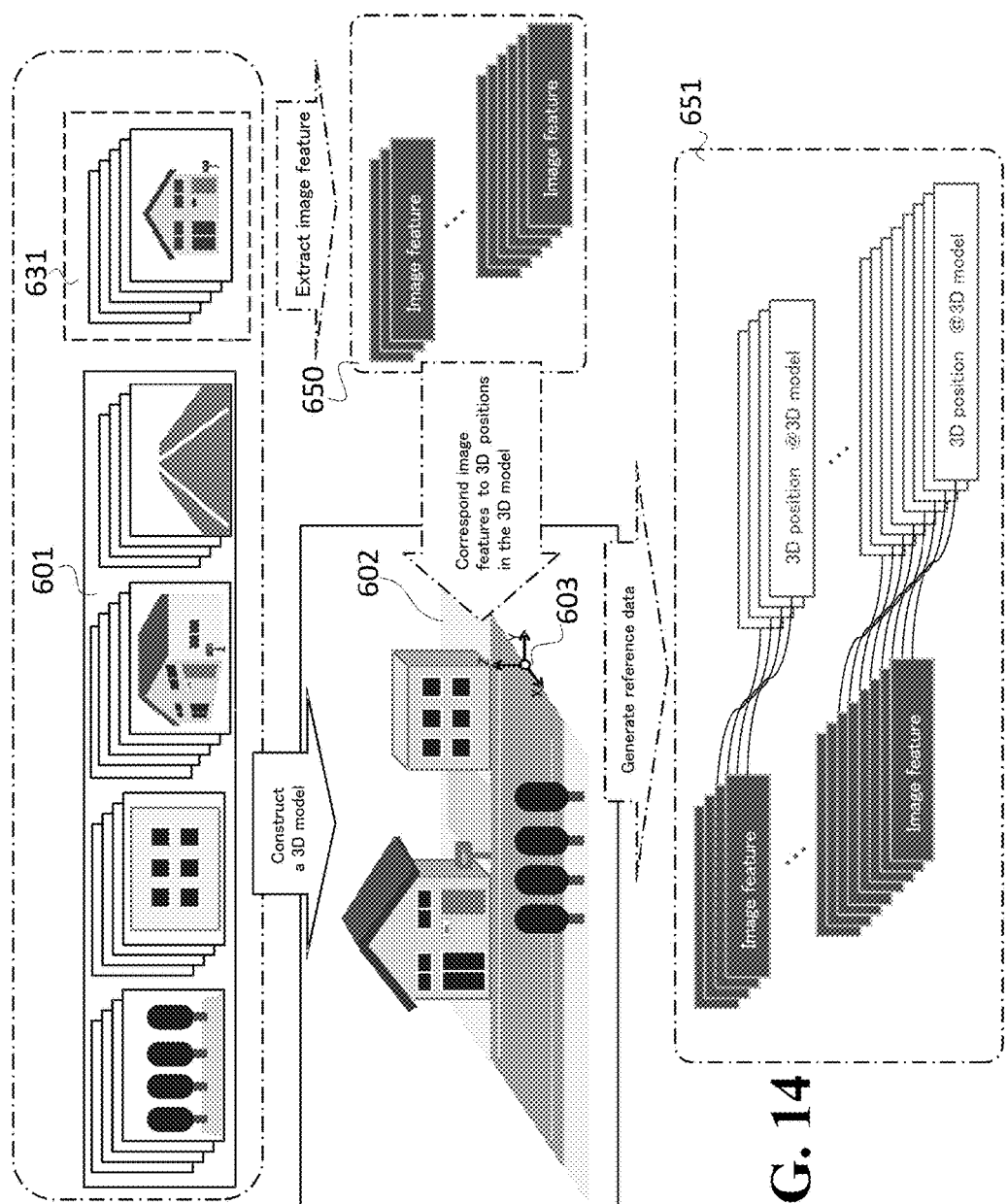
FIG. 14 shows a schematic of a data flow of reference data generation according to some embodiments.

FIG. 14 shows a schematic of a data flow of reference data generation according to some embodiments. The image feature extraction module 308 extracts image features 650 for a set of originally captured images 601 and a set of virtual images 631. At this point, each image 2D position is corresponded to a 3D position in the 3D model. As a result, pairs of image feature and 3D position are generated as reference data 651. The reference data memorization module 310 memorizes the reference data.

The user output module 311 displays the intermediate and resultant information of the learning mode to the user in an easy-to-understand way. For example, a simplified bird-eye view of the 3D model is displayed to the user, in which the start location, the target parking space, and the parking path taken in the learning mode are visualized.

Figure 15:
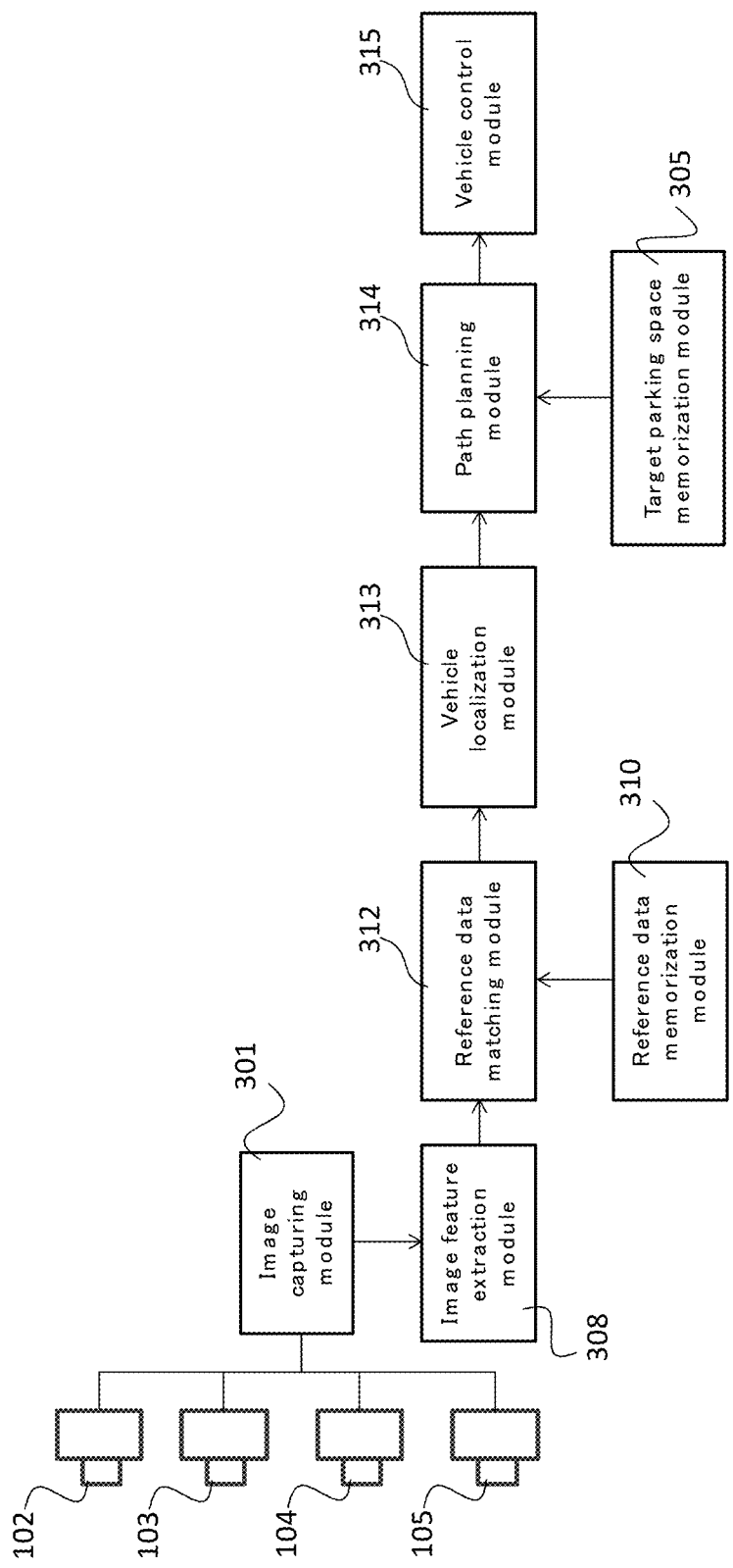
FIG. 15 shows a block diagram of function modules used in the auto-parking mode according to one embodiment.

FIG. 15 shows a block diagram of function modules used in the auto-parking mode according to one embodiment. The image capturing module 301 and the image feature extraction module 308 are same with those in the learning mode. In the auto-parking mode, however, the image capturing module 301 directly outputs a set of images, e.g., four images for each frame, to the image feature extraction module 308.

The reference data matching module 312 matches the input image features to the image features in reference data generated in the learning mode. Based on the matching results, each of reference data is ranked by the image feature similarity score, and the top N reference data (N is a fixed number and defined in advance) are selected. Euclidean distance between feature vectors is an example of similarity measure. After the matching, a 3D position is corresponded to each image feature based on the 3D points of the matched reference data.

Figure 16:
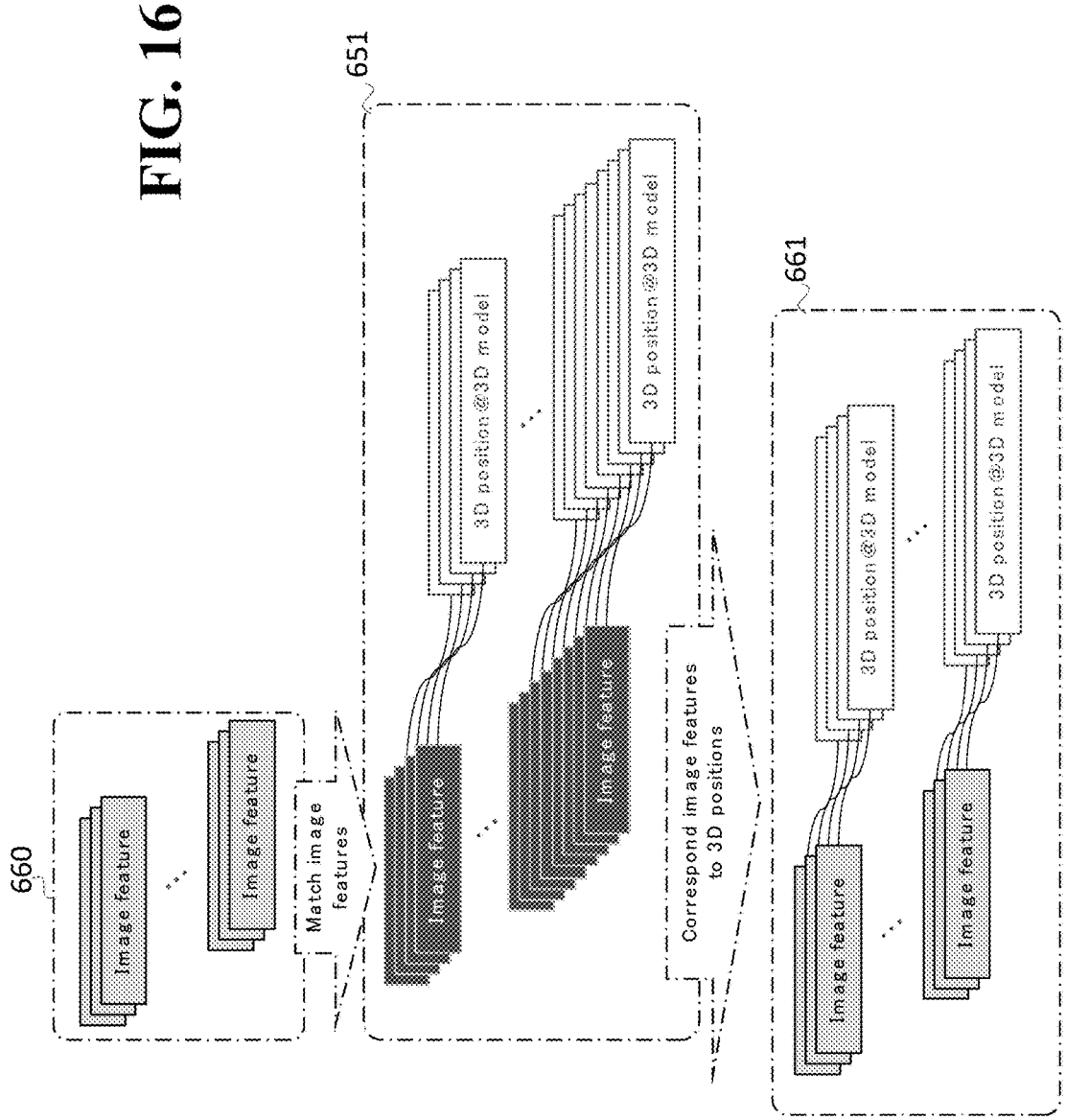
FIG. 16 shows data flow of feature matching process according to one embodiment.

FIG. 16 shows data flow of feature matching process according to one embodiment. First, image features of a set of input images 660 are matched to the reference data 651 based on image feature similarity. Then, 3D positions of the matched reference data are corresponded to each input image feature. As a result, a set of matching results 661 is generated.

The vehicle localization module 313 calculates a current state of the vehicle, i.e., vehicle's position and orientation in the 3D model at the current frame from the matching result output from the module 312. Since the correspondences between 2D image features and 3D positions in the 3D model are known at this point, the 3D position and orientation of each camera can be calculated using a class of algorithms called perspective-n-point algorithms. Moreover, since each camera is calibrated to the vehicle coordinate system (the relations are known), the 3D position and orientation of the vehicle can be also calculated by those of each camera, that is, the vehicle can be localized in the 3D model.

The path planning module 314 calculates path for parking from current vehicle location to the target parking space based on the localization results. The vehicle control module 315 controls the vehicle so that the vehicle moves along with the path calculated in the path planning module 314.

Figure 17:
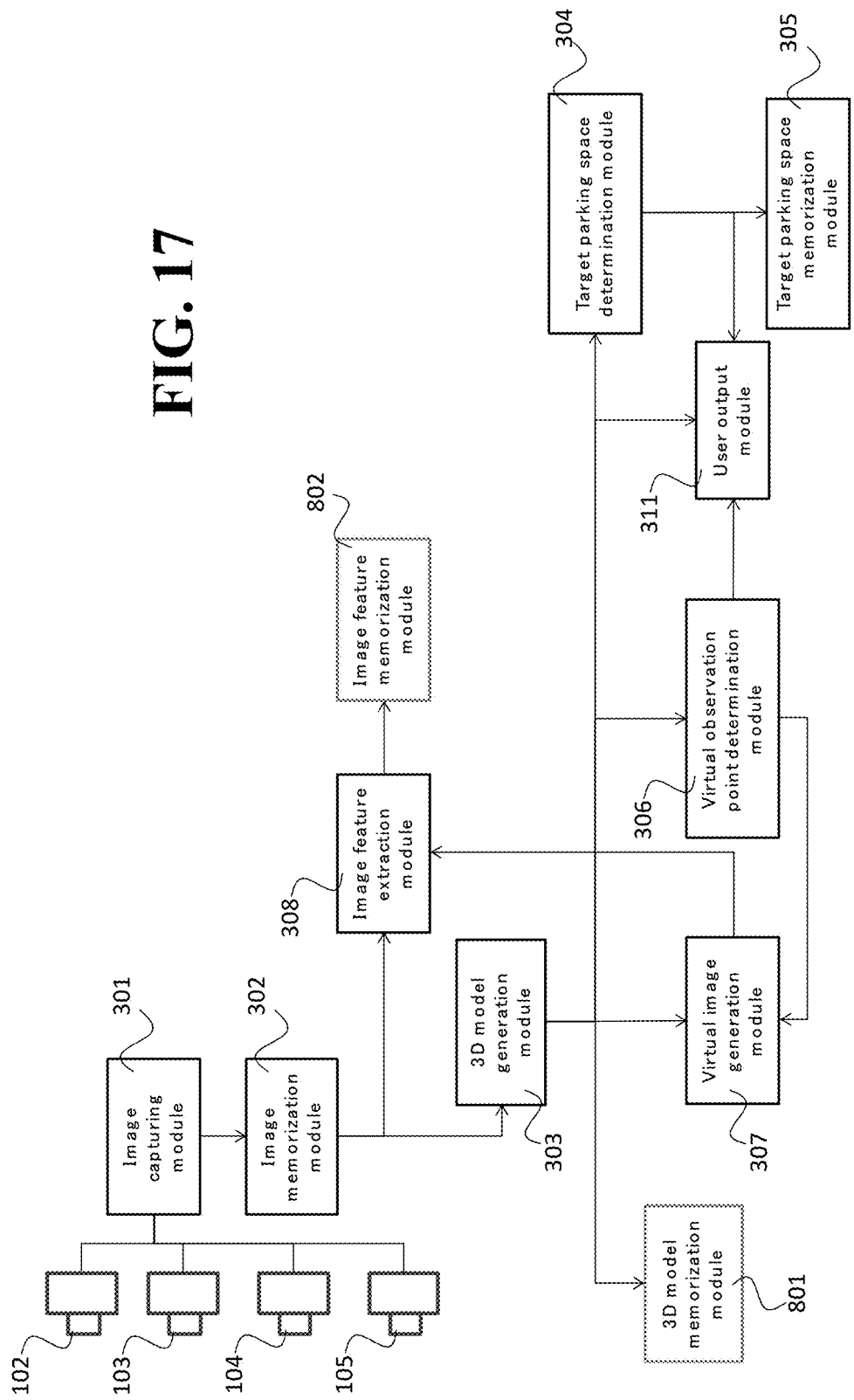
FIGS. 17 and 18 show block diagrams of function modules used in the leaning mode and the auto-parking mode, respectively, by some embodiments.
Figure 18:
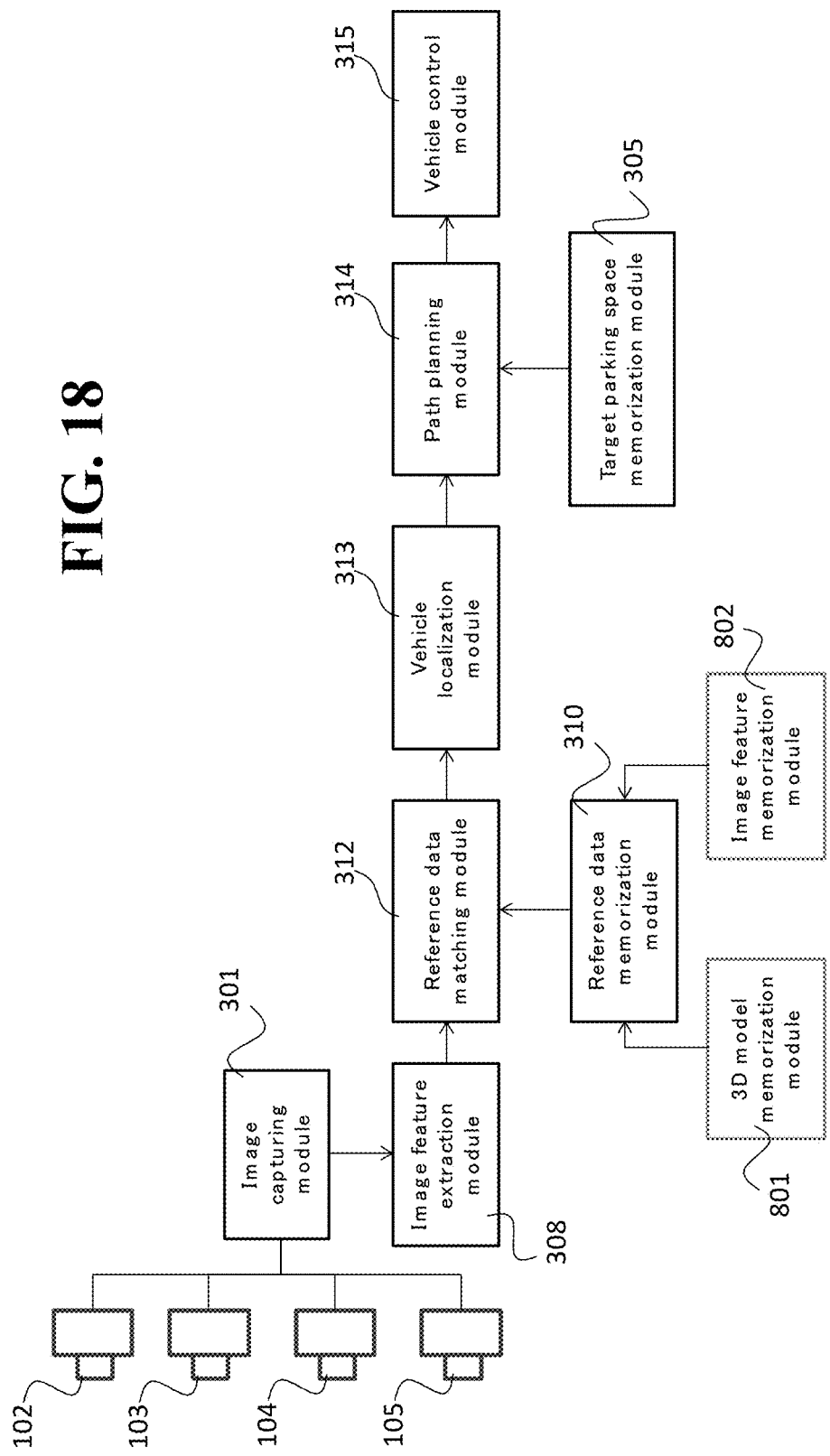

FIGS. 17 and 18 show block diagrams of function modules used in the leaning mode and the auto-parking mode, respectively, by some embodiments. In this embodiment, the reference data are generated in the auto-parking mode, not in the learning mode.

In the learning mode, the 3D model memorization module 801 memorizes the 3D model, and image feature memorization module 802 memorizes a set of image features. In the auto-parking mode, the reference data generation module 310 generates the reference data from the 3D model and image features memorized in the learning mode.

Figure 19:
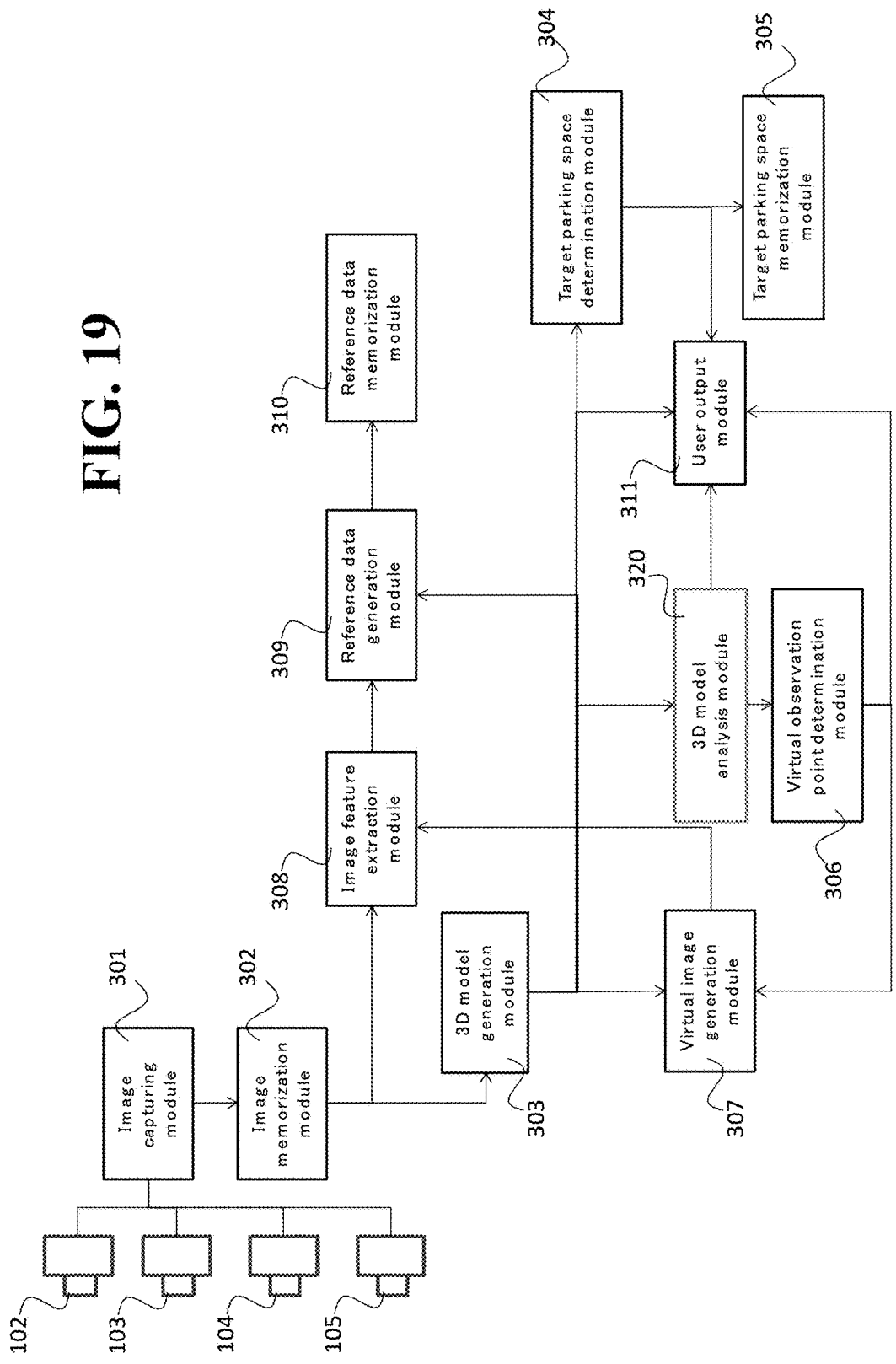
FIG. 19 illustrates another block diagram of function modules used in the learning mode by a different embodiment.

FIG. 19 illustrates another block diagram of function modules used in the learning mode by a different embodiment. The 3D model analysis module 320 detects free space (road region) for driving (parking) in the 3D model by segmentation, such as 2D plane fitting-based road scene segmentation or texture, color, and gradient-based road region detection. In addition, the module 320 also detects specific static objects such as buildings, houses, or sign boards by machine learning techniques.

The virtual observation point determination module 306 sets the virtual vehicle origins and coordinate systems on the free space and around the specific objects detected in the module 320 randomly or regularly. The virtual observation points are then determined according to the virtual vehicle coordinate systems.

This embodiment enables to set the virtual observation points more efficiently. If the system set the virtual observation points densely and uniformly on the free space, we can generate the virtual images which possibly have more similar appearances and image features with those of input images in the auto-parking mode, since all the input images are always captured at somewhere on the free space. Moreover, by setting the virtual observation points around the specific objects, the embodiment can generate dense image features. As a result, this embodiment makes auto-parking more stable and robust.

Figure 20:
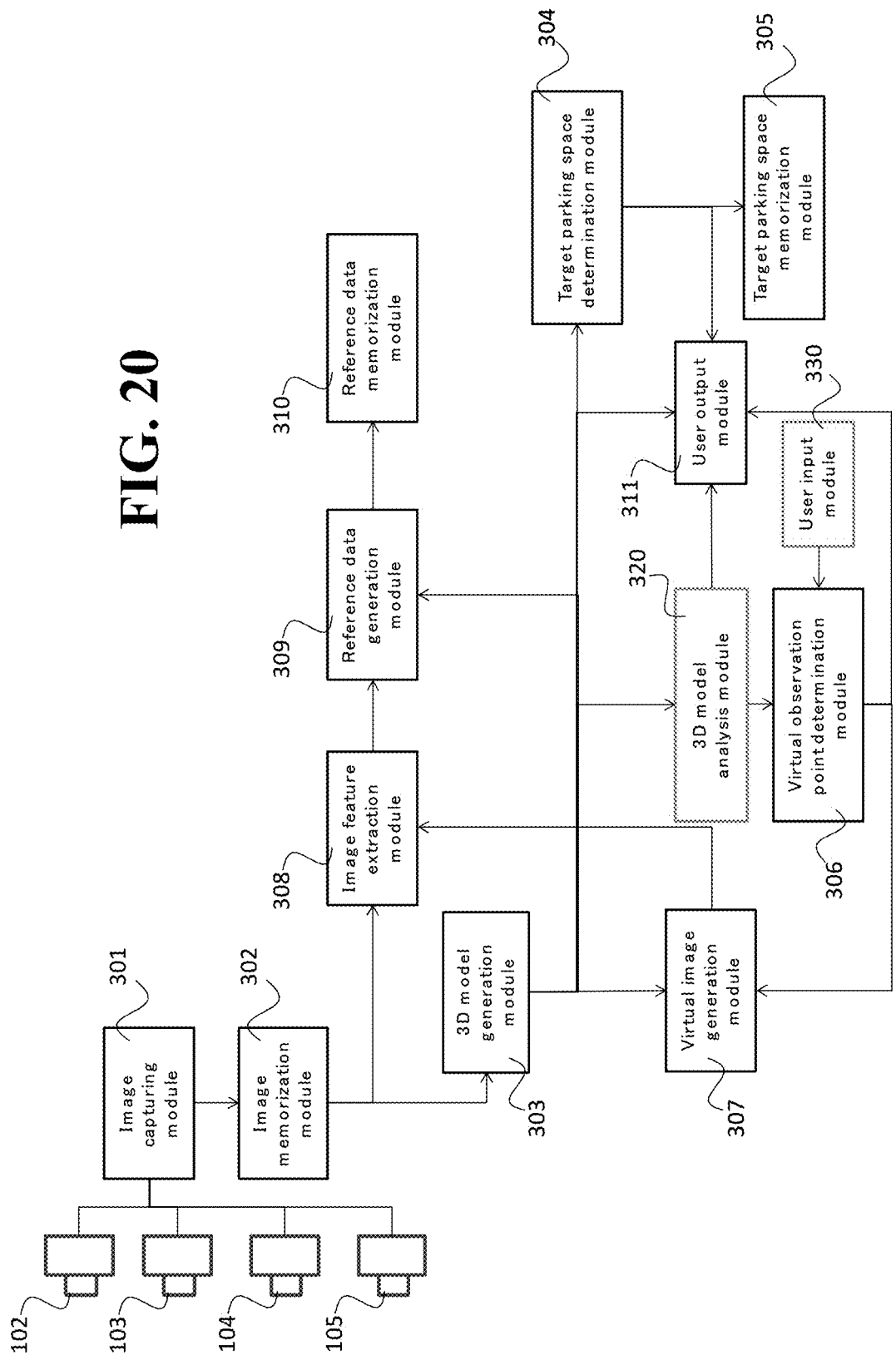
FIG. 20 shows another block diagram of function modules used in the learning mode.

FIG. 20 shows another block diagram of function modules used in the learning mode. The user input module 330 receives the driver's inputs and outputs them to the virtual observation point determination module 306. In this embodiment, the virtual observation point determination module 306 determines the virtual viewpoints based on the user (driver) input.

The user input module 330 provides an interface function which enables the driver to specify the source information of the virtual observation points in the 3D model intuitively, while the user output module 311 displays the 3D model and analyzed results (free space and specific static objects detected in the 3D model analysis module 320) in an easy-to-understand way on the interface device so that the driver can instantly understand the surrounding environment.

For example, let us assume a touch panel display as an interface device. The user output module 311 displays the top view of the 3D model in which free space and objects are represented with their labels on the panel. Then, the driver specifies the desired points for virtual observation on the displayed map by touch operation, while the user input module 330 receives the driver's inputs. The user input module 330 outputs the point data to the virtual observation point determination module 306.

Figure 21:
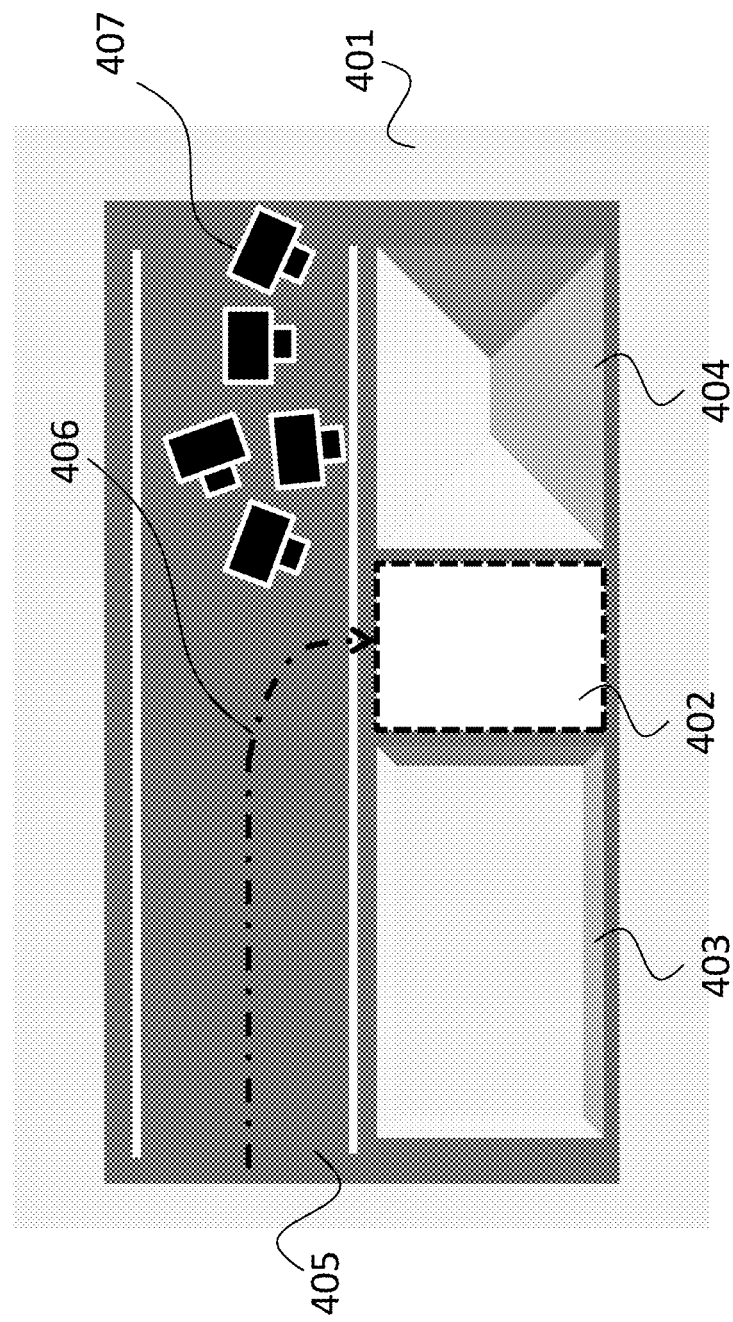
FIG. 21 shows an exemplar interface for selecting direction of the parking according to one embodiment.

FIG. 21 shows an exemplar interface for selecting direction of the parking according to one embodiment. In this figure, the target parking space 402, objects (building and house) 403 and 404, free space (road region) 405, the parking path taken in the learning mode 406, and specified virtual observation points 407 are visualized in the bird-eye view of the 3D model 401. In this example, the specified virtual observation points 407 are visualized in the form of camera-shaped icons to assist intuitive operation of the driver.

Figure 22:
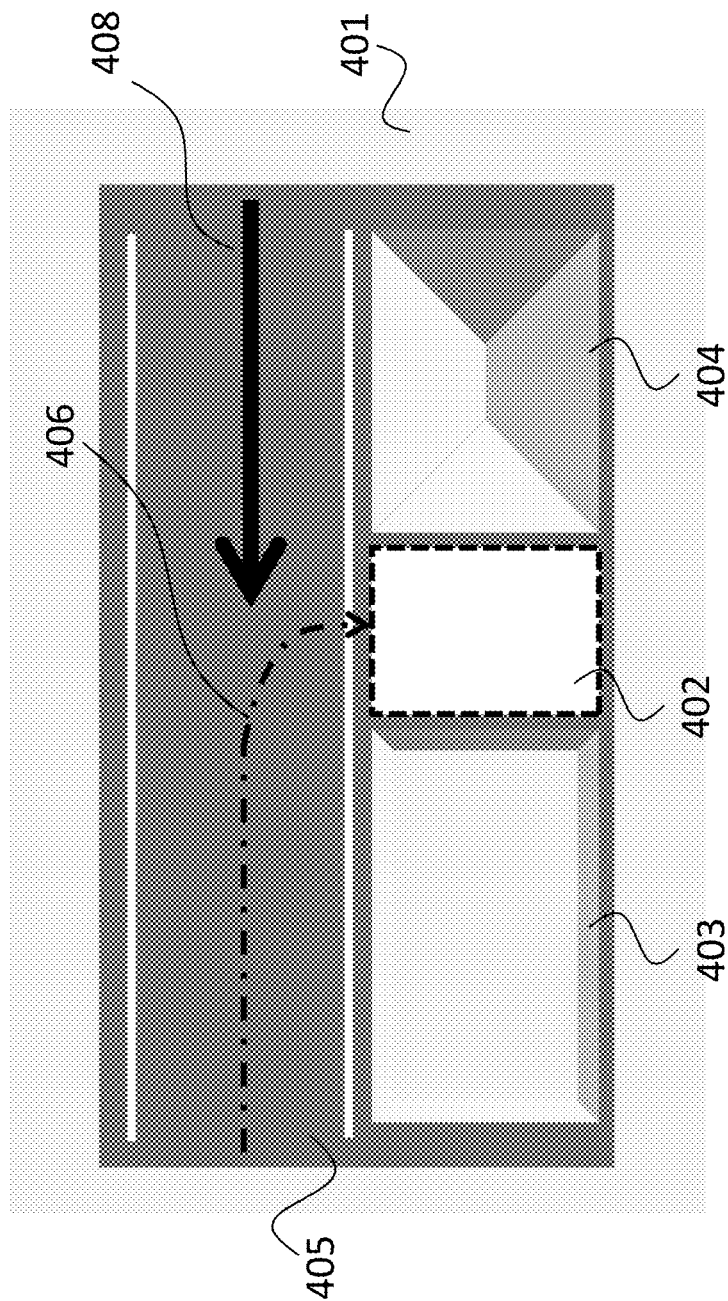
FIG. 22 shows another interface for selecting direction of the parking according to one embodiment.

FIG. 22 shows another interface for selecting direction of the parking according to one embodiment. In this example, the driver can specify the virtual observation points by drawing the desired parking path on the bird-eye map.

The desired parking path or direction of the parking 408 is visualized in the bird-eye map 401 in this figure. The user input module 330 outputs the driver's inputs in the form of paths to the virtual observation point determination module 306, and the virtual observation point determination module 306 generates virtual observation points along with the specified paths by converting the linear path information to discrete point sequence information. This embodiment enhances the usability of the auto-parking system. That is, the driver can use the auto-parking system more easily and intuitively to suit the driver's needs.

Figure 23A:
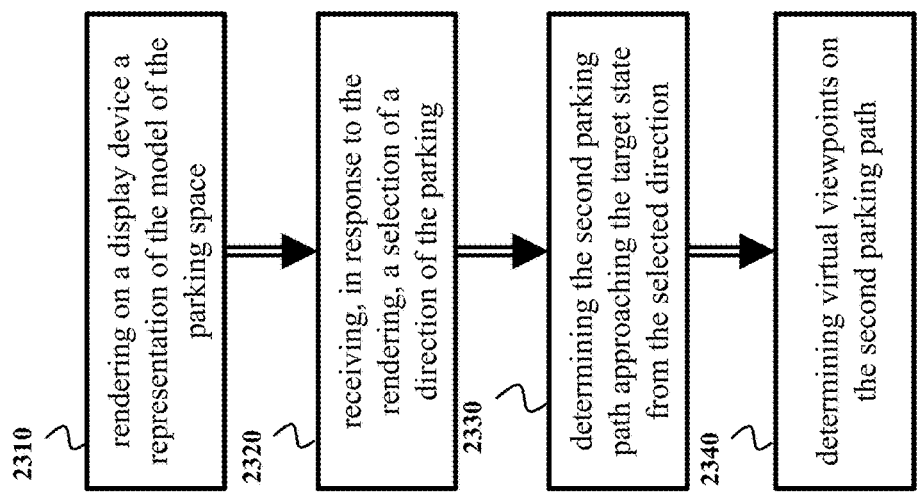
FIG. 23A shows a block diagram of a method used by some embodiments for selecting viewpoints outside of the first parking path.

FIG. 23A shows a block diagram of a method used by embodiments for selecting viewpoints outside of the first parking path. In those embodiments, the method receives 2320, in response to the rendering 2310 on a display device a representation of the model of the parking space, a selection of a direction of the parking. This selection is used for determining 2330 the second parking path approaching the target state from the selected direction. For example, a state of the vehicle is selected according the direction and the second parking path is determined using the model of the vehicle. After the second path is determined, the set of virtual viewpoints is selected 2340 on the second parking path.

Figure 23B:
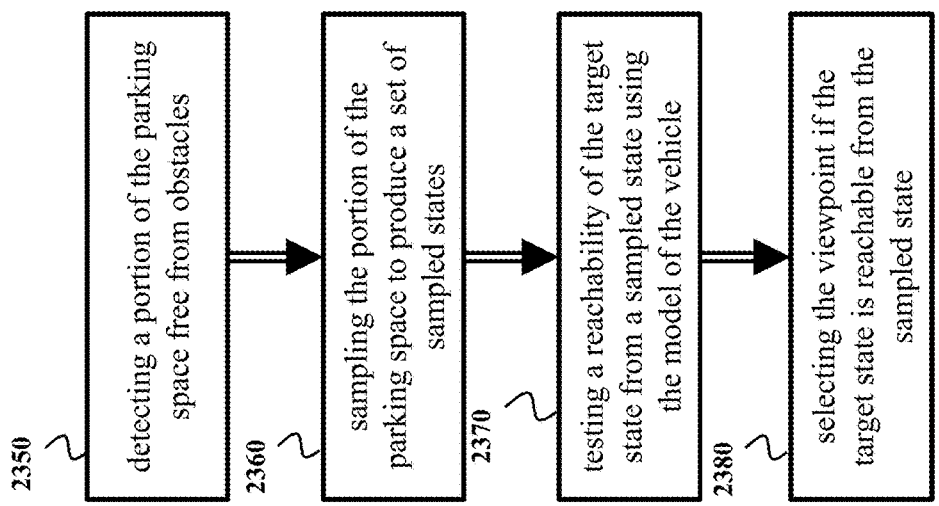
FIG. 23B shows a block diagram of an alternative method used by one embodiment for selecting viewpoints outside of the first parking path.

FIG. 23B shows a block diagram of an alternative method used by one embodiment for selecting viewpoints outside of the first parking path. In this embodiment, the viewpoints are selected without the input from the user. Specifically, this embodiment detects 2350 a portion of the parking space free from obstacles. For example, the free from obstacle portion of the parking space can be determined using the segmentation of the model of the parking space, as described with regard to FIG. 19.

The embodiment samples 2360 the portion of the parking space to produce a set of sampled states and selects the set of viewpoints from the set of sampled states. In one embodiment, all sampled states are used as the virtual viewpoints. Some alternative embodiments perform the sampling using a reachability criterion. According to the reachability criterion, the sample in the state space is preserved only if that sample is reachable from the target state. In one embodiment, to avoid usage of the dynamic of the vehicle to test reachability, the reachability is defined as an absence of non-reachability, and non-reachability is a predetermined area near the sides of the vehicle.

Figure 23C:
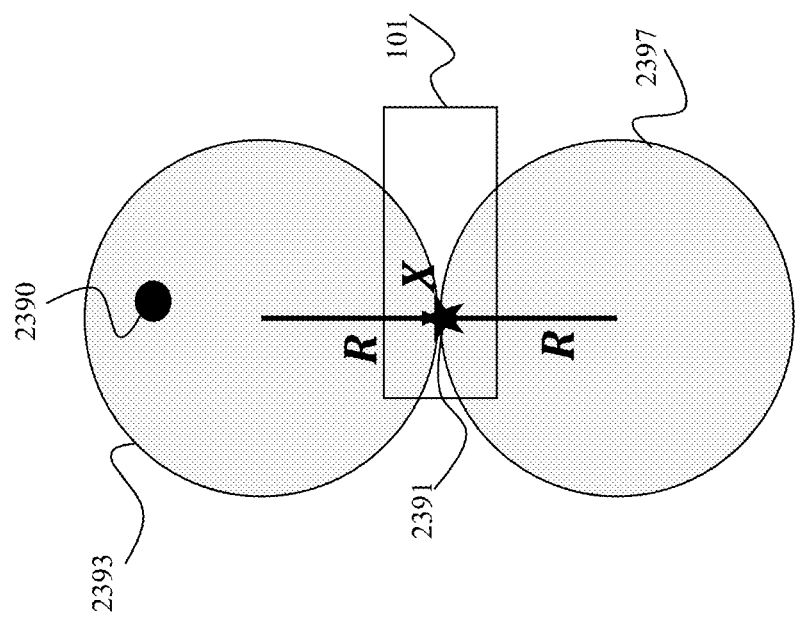
FIG. 23C shows a schematic of exemplar non-reachable areas for a vehicle according to some embodiments.

FIG. 23C shows a schematic of exemplar non-reachable areas 2393 and 2397 for a vehicle 101 in the state 2391 defining position and orientation of the vehicle. In this example, the non-reachable areas are represented by the circles of the vehicle motion starting at the state 2391 and moving at the predetermined speed with the wheel of the vehicle reaching the maximum extend to the left or to the right. If the target state 2390 is within the non-reachable areas 2393 and 2397, the state 2391 is rejected. To that end, this embodiment tests 2370 a reachability of the target state from a sampled state using the model of the vehicle and selects 2380 the viewpoint corresponding to the sampled state into the set of viewpoints if the target state is reachable from the sampled state.

In various embodiments, the path planning is performed in advance or in real time. For example, the advance path planning can predetermine different parking paths leading to the target state from different directions. In those situations, the direction 408 allows for selection of the second parking path from the predetermined parking paths. Additionally, or alternatively, in some implementations, the free space of the parking space is sampled as indicated by the direction 408 and the sampled state of the vehicle are used for determining the alternative parking paths, such as the second parking path.

Figure 24:
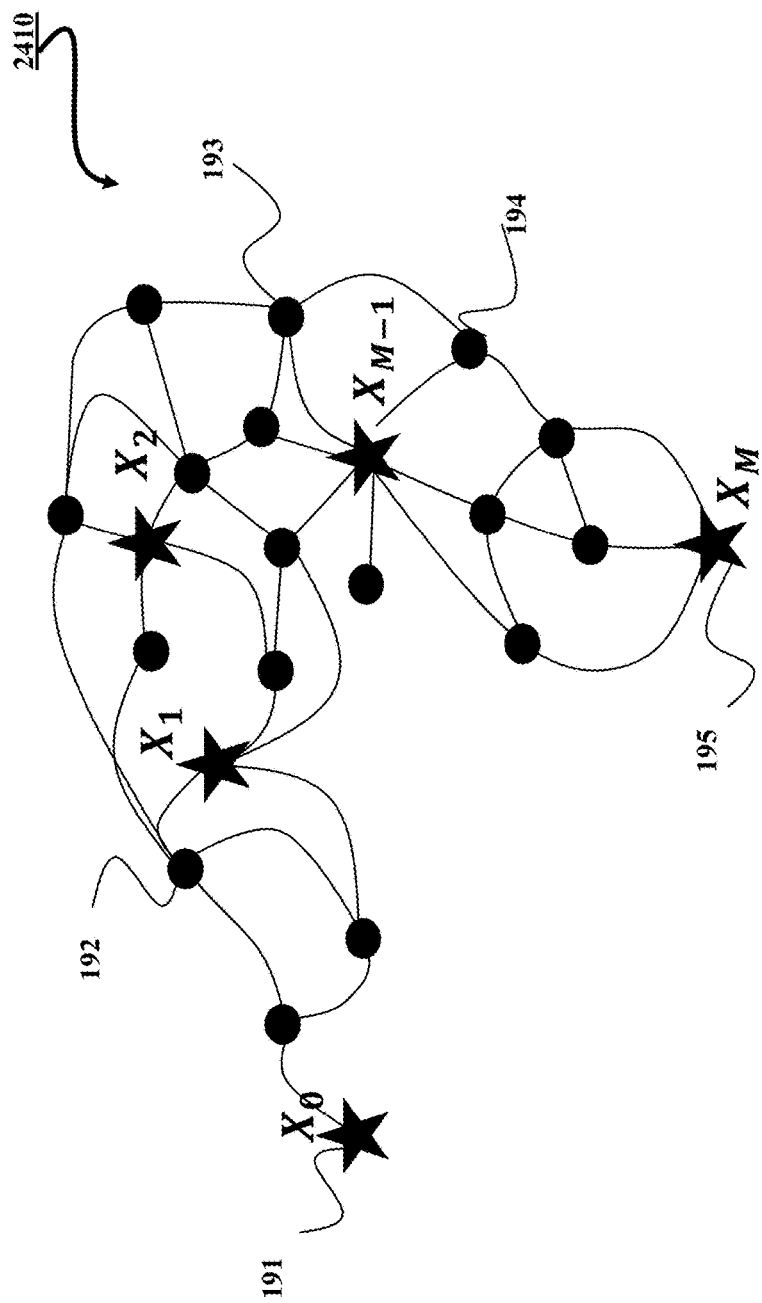
FIG. 24 shows an exemplar schematic of possible parking paths of the vehicle through the parking space.

FIG. 24 shows an exemplar schematic of possible parking paths of the vehicle 101, through the parking space. In this example, the cameras acquire images only at the states {$X_0$, $X_1$, $X_2$, ... $X_{M-1}$, $X_M$} depicted as stars and corresponding to the set of viewpoints. Those states are used as seeds to grow a graph 2410. The graph 2410 has multiple nodes connected with edges. Each node defines the state of the vehicle and each edge connecting two nodes defines a feasible path between the two nodes. To that end, a path from any node to a target node 195 of the target state through the edges connecting the node to the target node is a possible parking path.

The nodes of the graph are selected as the virtual viewpoints for determining virtual images. The features from the virtual images corresponding to nodes depicted using circles and stars, such as nodes 191, 192, 193, 194, 195, are used as reference data. During the auto-parking stage, if the current position of the vehicle is close to at least one of the node, the path from that node to the target state 195 can be readily selected from the graph 2410.

The graph 2410 can be generated using a model of the vehicle, e.g., dynamic and/or kinematic model. As used herein, a dynamic model of a vehicle accounts for time-dependent changes in the state of the vehicle. Dynamic models typically are represented by differential equations. In one embodiment, the dynamic model of the vehicle is fifth order differential equations $$\dot{x}\pm=\cos(\theta)\cos(\zeta)v$$

$$\dot{y}=\sin(\theta)\cos(\zeta)v$$

$$\dot{\theta}=\sin(\zeta)v/l$$

$$\dot{v}=a_1$$

$$\dot{\zeta}=a_2 \quad (1)$$

where v the velocity of the front wheels, $\zeta$ the angle between the front wheels and the vehicle orientation, $a_1$ the translational acceleration, $a_2$ the steering angular velocity, and l the distance between (x, y) and the midpoint of the front wheels.

For the path planning, some embodiments use a kinematic model of the vehicle that describes the motion of the vehicle without consideration of the mass of the vehicle or the forces that caused the motion.

In one embodiment, the following kinematic model is considered $$\dot{x}=\cos(\theta)u_1$$

$$\dot{y}=\sin(\theta)u_1$$

$$\dot{\theta}=u_2, \quad (2)$$

where $u_1=\cos(\zeta)v$ the velocity of the midpoint of the rear wheel axis, $u_2=\tan(\zeta)u_1/l$.

A path is kinematically feasible if it is a solution of the kinematic model (2). A vehicle state X=(x, y, $\theta$) is collision free only if the vehicle located at position X does not collide with any obstacle, and lies completely inside the boundary of the parking space. The initial state 101 is abbreviated as $X_0=(x_0, y_0, \theta_0)$, and the target state 102 is denoted by $X_f=(x_f, y_f, \theta_f)$. For a specific parking task with a parking space represented by a rectangle L×H, the vehicle state always belongs to a state space X: [0, L]×[0, H]×[0,2π).

Figure 25A:
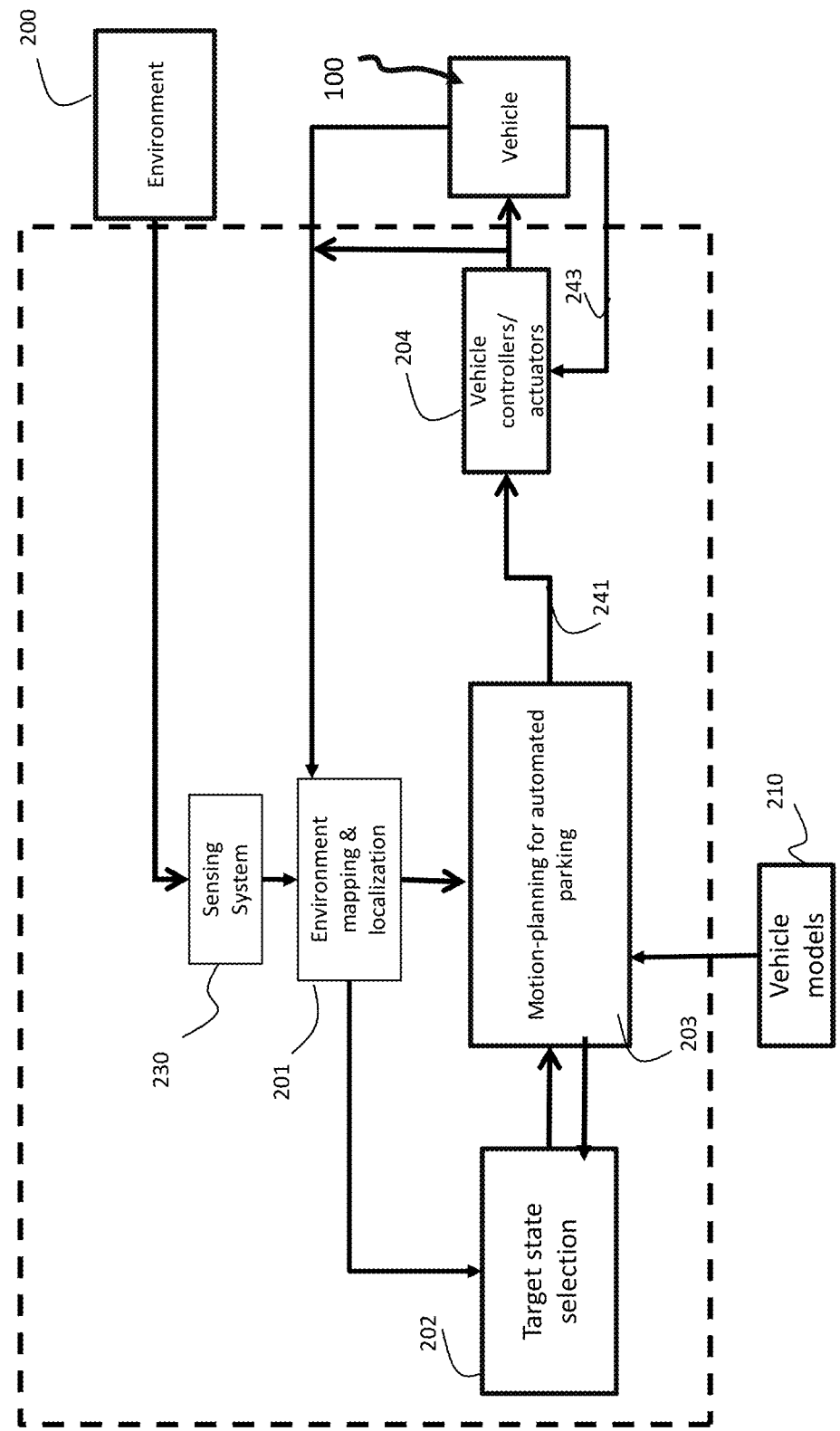
FIG. 25A shows a function diagram of automated parking system according to one embodiment.

FIG. 25A shows a function diagram of automated parking system according to one embodiment. Environment mapping and localization block 201 constructs or updates the model of the parking space, and determines the current location of the vehicle by sensing the environment and vehicle operation condition. For example, the mapping and localization block 201 can include the localization block 313. For example, the mapping and localization block 201 can also include an inertial measurement unit, which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 200 can be video cameras capturing obstacles including other vehicles, pedestrians, and buildings, ultrasonic/radar sensors detecting distance between the vehicle and obstacles.

Target state selection block 201 selects a target state for a parking spot to park the vehicle by identifying parking lot candidates, and sends the target state to a motion planning block 203. In one embodiment, the available parking spots are tracked by a separate system associated with the management of the parking garage. Additionally, or alternatively, the parking spots can be detected using the sensors 203 of the automated parking system. The motion planning 203 initiates a complete motion planning procedure to determine a parking path 241 based on the vehicle models 210, the initial and target states of the vehicle, and the map of the parking space. In one embodiment, the parking path defines profiles of the vehicle velocity and steer angle over time. In another embodiment, the parking path defines the profile of the vehicle state (x, y, $\theta$) over time.

Given the parking path 241, vehicle controllers and actuators 204 determine and exert control commands to enforce the vehicle state track the reference trajectory 241 if the parking path is state profile, or to enforce the vehicle velocity and steer angle track the parking path if the parking path is the vehicle velocity and steer angle profiles. In one embodiment, the control commands could be gas pedal pressure or steering torque. The vehicle controller/actuators may also use signal 243 to determine control commands. The signal 243 can be a measured steering angle, or measured currents of motors moving the steering wheel or the gas pedal.

Figure 25B:
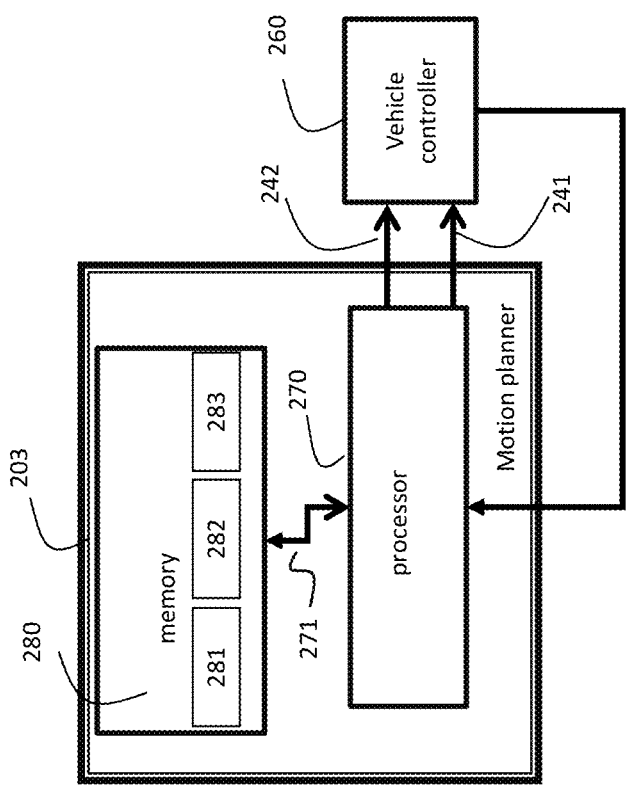
FIG. 25B shows a general structure of the motion-planning system according to one embodiment.

FIG. 25B shows a general structure of the motion-planning system 203 according to one embodiment. The motion-planning system 203 includes at least one processor 270 for executing modules of the motion-planning system 203. The processor 270 is connected 271 to a memory 280 that stores geometrical information 281 such as geometry of the vehicle and a model of the parking space. The memory 280 can also store the models of the vehicle 282 such as a kinematic model of the vehicle and a dynamic model of the vehicle. The memory 280 can also store the internal information 283 of the motion planner, including, but not limited to, an initial state of the vehicle, a target state of parked vehicle. In some embodiments, the memory 280 can include stored instructions implementing the method for the automated parking, wherein the instructions, when executed by the processor 270 carry out at least some steps of the method.

Some embodiments are based on recognition that the virtual images can further be used to increase the density and accuracy of the model of the parking space. For example, some embodiments use visual simultaneous localization and mapping (SLAM) that uses images as visual sensor data input for reconstructing a three-dimensional (3D) model of a scene. Some embodiments use virtual images generated for automatic parking in order to provide such a visual SLAM (VSLAM) that is suitable for constructing a 3D model of the scene with a reduced number of images used for tracking the pose of the sensor. Such a VSLAM is referred herein as a virtually-augmented VSLAM (VA-VSLAM). The VA-VSLAM can construct similar models of the scene with a smaller number of images, or alternatively better models of the scene with a same number of images, than a conventional VSLAM. To that end, using a smaller number of images, VA-VSLAM can reduce the computational power and memory usage and can simplify the trajectory followed by the sensor to map the environment. Alternatively, using a same number of images, VA-VSLAM can generate a 3D model with higher accuracy, leading to higher accuracy in self-localization using the 3D model.

Figure 26A:
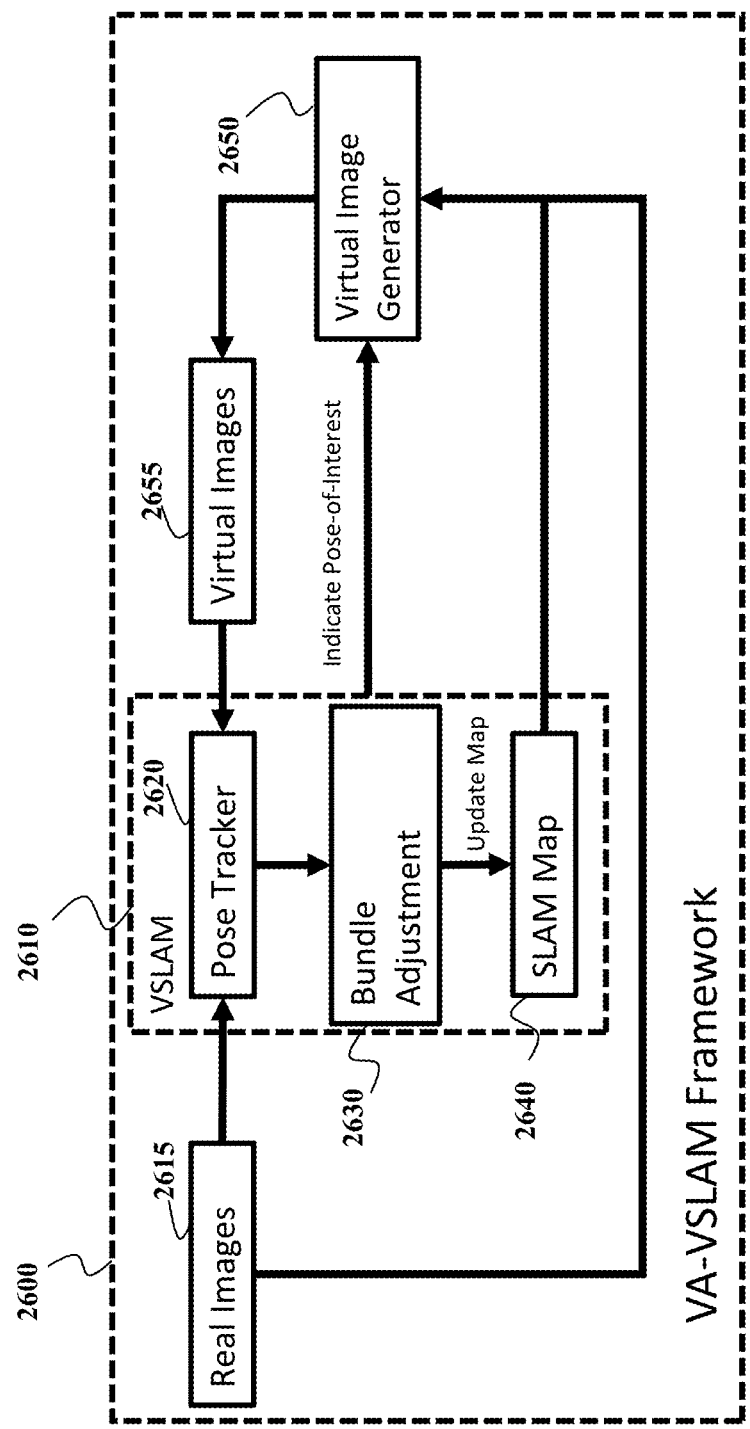
FIG. 26A shows a block diagram of a VA-VSLAM framework according to some embodiments.

FIG. 26A shows a block diagram of a VA-VSLAM framework 2600 according to some embodiments taking advantage of a VSLAM framework 2610 to estimate both one or more cameras' 6D poses (positions and orientations) and a 3D description of the geometric surroundings. The VA-VSLAM framework works by matching between a set of features on the currently observed real images captured by the cameras and/or sensors from some real viewing poses, and a set of features on the virtually generated images observed by a virtual camera from some virtual viewing poses. Steps of the method can be performed by a processor, such as the general processor 161 and/or specialized processors 166, 167, and 168 connected to a memory, such as the memory 164, storing the set of images and coupled with stored instructions, such as the software 165 implementing the method. The instructions, when executed by the processor carry out at least some steps of the method of the VA-VSLAM framework 2600.

The VA-VSLAM framework 2610 works as follows. A set of real frames, $\{\mathcal{F}_i\}$ of the images, are processed by some feature extractors to select a set of features, $f^i \triangleq \{f_j^i\}$, on each frame $\mathcal{F}_i$ of an image. A frame $\mathcal{F}_i$ can include a regular 2D image with one channel of gray information or three channels of RGB information and/or a 3D image with four channels of RGBD information where the fourth channel describes the depth of the pixel, i.e., the distance along the camera's viewing direction between the camera center and the closest object along the ray direction of that pixel. A process of determining the ray direction of a pixel is known as a back-projection of the pixel, and can be performed by using intrinsic parameters of the camera. For example, a feature can be either a 2D point if frame $\mathcal{F}_i$ is a 2D image, or a 3D point if frame $\mathcal{F}_i$ is a 3D image, as long as this feature is significantly different from its neighbor regions either in geometry or in appearance. Examples of feature extractors include Harris, FAST or ORB key point detectors.

Then this feature set $f^i$ are matched against another set of features $f^{i'}$ to find corresponding feature pairs $\{(j, j')\}$ such that feature $f_j^i$ and feature $f_{j'}^{i'}$ correspond to a same physical region, termed as a landmark or an interest point, in the scene. Such matching can be done through various feature description methods such as Scale Invariant Feature Transform (SIFT), which localizes interest points and generates their descriptions, Speed Up Robust Features (SURF), Gradient Location-Orientation histogram (GLOH), ORB, or other comparable techniques and/or sampling-based methods such as RANSAC.

Using the corresponding feature pairs, the visual SLAM 2610 can track the pose 2620 of this frame $\mathcal{F}_i$, with respect to either one previously observed frame $\mathcal{F}_k$ or a map 2640 $M \triangleq \{f^k; k=0, \ldots, n\}$ containing all previously observed frames, depending on how the feature set $f^i$ is constructed. The tracked pose and feature correspondences are sent to a bundle adjustment 2630 to find out the best 6-DOF poses of frames and 3D geometry descriptions of features used to further update the map 2640.

Given a set of images depicting a number of 3D points from different viewpoints, the bundle adjustment 2630 can be defined as the problem of simultaneously solving one or combination of refining the 3D coordinates describing the scene geometry, the parameters of the relative motion of the camera, and the optical characteristics of the camera(s) employed to acquire the images, according to an optimality criterion involving the corresponding image projections of all points.

In one embodiment, bundle adjustment includes minimizing the re-projection error between the image locations of observed and predicted image points, which is expressed as the sum of squares of a large number of nonlinear, real-valued functions. Thus, the minimization is achieved using nonlinear least-squares methods. For example, one embodiment uses Levenberg-Marquardt optimization due to its ease of implementation and its use of an effective damping strategy that lends it the ability to converge quickly from a wide range of initial guesses. By iteratively linearizing the function to be minimized in the neighborhood of the current estimate, the Levenberg-Marquardt method involves the solution of linear systems termed the normal equations. When solving the minimization problems arising in the framework of bundle adjustment, the normal equations have a sparse block structure owing to the lack of interaction among parameters for different 3D points and cameras. This can be exploited to gain computational benefits by employing a sparse variant of the Levenberg-Marquardt algorithm which explicitly takes advantage of the normal equations zeros pattern, avoiding storing and operating on zero-elements.

The VA-VSLAM of some embodiments aims to reduce a number of images 2615 acquired for constructing the 3D map or 3D model of the scene 2640. To that end, some embodiments are based on recognition that the images 2615 need to be acquired from relatively distant viewpoints. In such a manner, fewer images can be used to capture the intricacies of the scene. However, such an approach creates the large-baseline matching problem rooted in the pose tracking 2620. Specifically, a landmark observed from two spaced apart views can be missed by the VSLAM matching process, because the appearances of the same landmark viewed from different viewpoints can change significantly.

To that end, the VA-VSLAM framework 2600 includes a virtual image generator 2650 to apply the concept of virtual frames or images 2655 to address the above mentioned limitations. The VA-VSLAM explicitly transforms the observed features on real images to features on virtually observed images, instead of merely relying on the limited viewpoint invariance of existing feature matching methods.

The virtual frame generator 2650 transforms the images 2615 to produce virtual images $\{V_i\}$ 2655 of the scene viewed from virtual viewpoints. These virtual images are then submitted to the visual SLAM 2610 to extract virtual features $\{v_j^i\}$ to help the pose tracker improve localization robustness and accuracy, and to augment the SLAM map as $\Psi \triangleq \{f^k U v^j;\ k=0, \ldots, n,\ l=0, \ldots, m\}$.

Figure 26B:
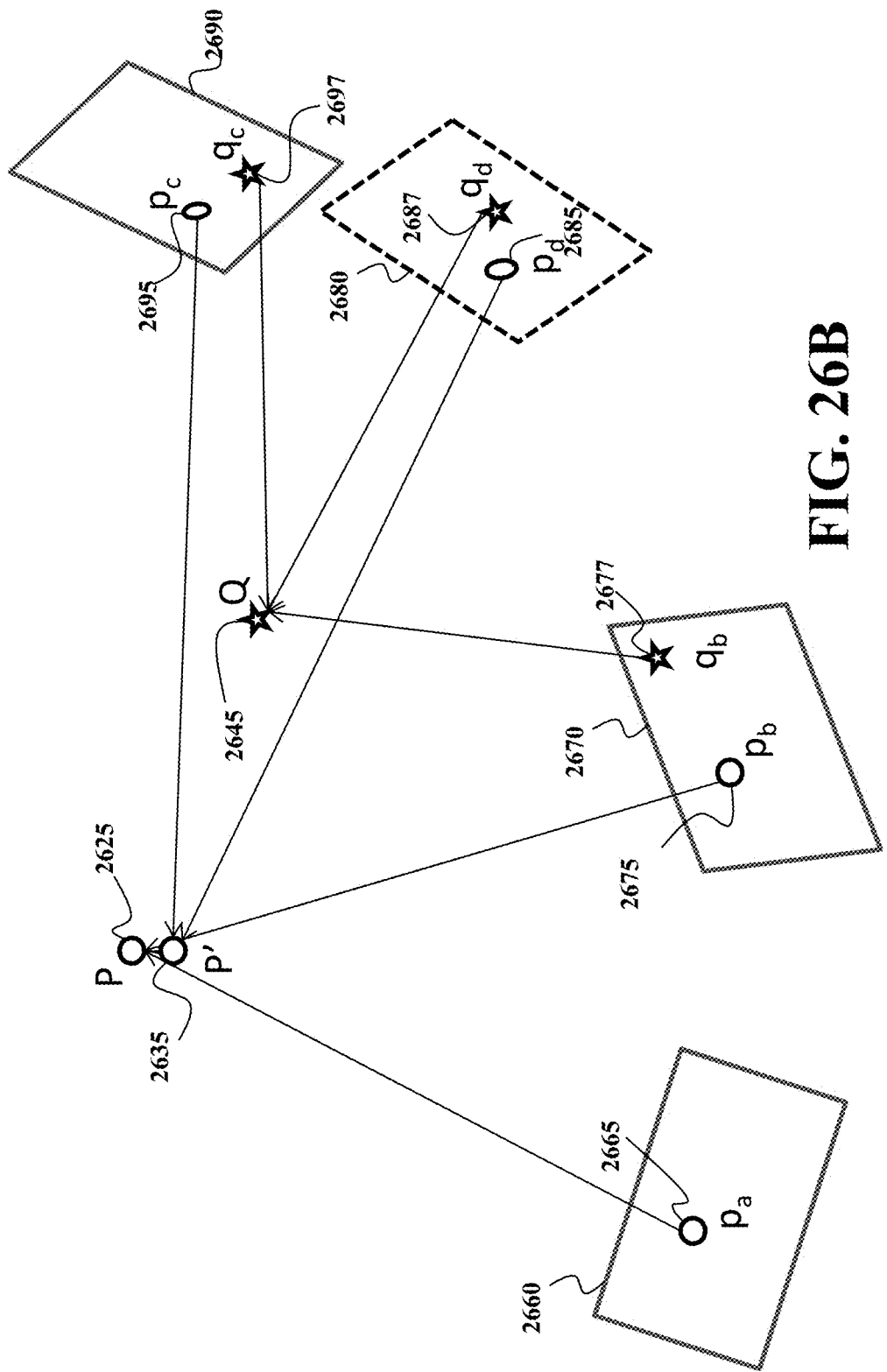
FIG. 26B shows an example of a schematic of addressing the large-baseline matching problem using virtual images according to some embodiments.

FIG. 26B shows an example of a schematic of addressing the large-baseline matching problem using virtual images according to some embodiments. In this example, the images 2660, 2670, and 2690 are real images acquired by a sensor having different poses, i.e., the images 2660, 2670, and 2690 have different viewpoints. The image 2680 is a virtual image having a virtual viewpoint. The viewpoints of the images 2660 and 2670 are relatively close to each other. To that end, the images 2660 and 2670 include landmarks 2665 and 2675 corresponding to the same feature in the scene, i.e., the pixels of the landmarks 2665 and 2675 correspond to the same point P in the scene, and have similar geometry and/or appearance. Using a triangulation or any other suitable computational technique, it is possible to compute the coordinates 2625 of the point P in the scene. However, when only two images are used for determining the coordinates of the point P, such coordinates might be inaccurate.

The image 2690 also includes landmark 2695 representing the same point P in the scene as the landmarks 2665 and 2675. However, the viewpoint of the image 2690 is so different from the viewpoints of the images 2660 and 2670 that the landmark 2695 has different appearance and cannot be matched with the landmarks 2665 and 2675. However, the viewpoint of the virtual image 2680 is closer to the viewpoint of the image 2690 and the landmark 2685 that corresponds to the same point P as landmarks 2665 and 2675 has more similar appearance to the landmark 2695 and can be matched with the landmark 2695. In such a manner, some embodiments can determine that the landmarks 2665, 2675, and 2695 correspond to the same point P in the scene. To that end, the pose of the image 2690 can be used to update the coordinates of the point P to the coordinates 2635 of the point P'. In such a manner, the usage of the virtual image increases the accuracy of the model of the scene.

Similarly, the image 2670 includes a landmark 2677 corresponding to a point Q in the scene. The image 2690 also includes landmark 2697 representing the same point Q in the scene as the landmarks 2677. However, the viewpoint of the image 2690 is so different from the viewpoints of the image 2670 that the landmark 2697 has different appearance and cannot be matched with the landmark 2677. To that end, the coordinates of the point Q are unknown and the point Q cannot be added to the model of the scene.

However, the viewpoint of the virtual image 2680 is closer to the viewpoint of the image 2690 and the landmark 2687 that corresponds to the same point Q as the landmark 2677 has more similar appearance to the landmark 2697 and can be matched with the landmark 2697. In such a manner, some embodiments can determine that the landmarks 2677 and 2697 correspond to the same point Q in the scene. To that end, the pose of the image 2690 can be used to determine the coordinates 2645 of the point Q and the point Q can be added to the model of the scene. In such a manner, the usage of the virtual image increases the density of the model of the scene with fewer images than otherwise would require.

Figure 27:
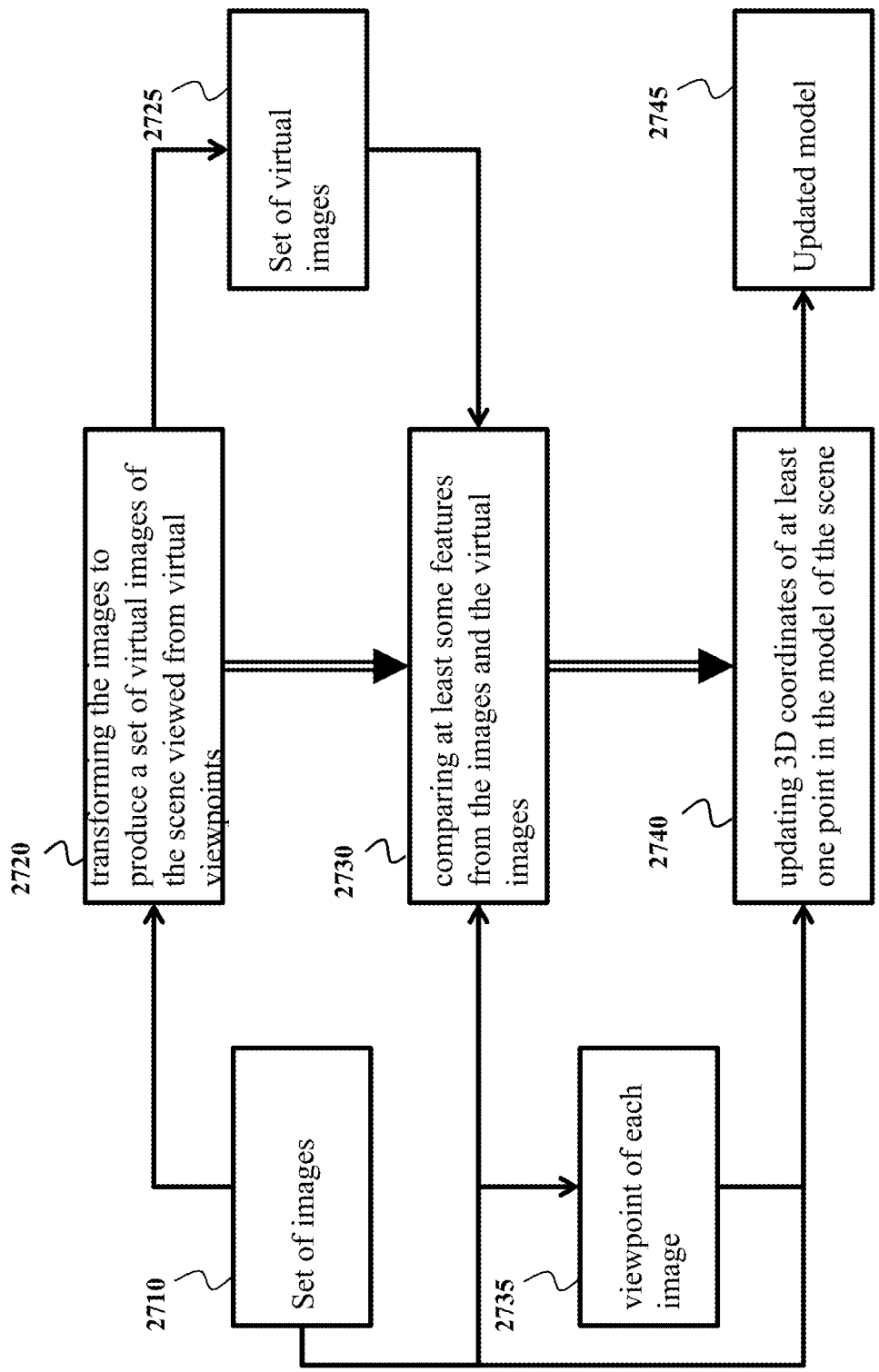
FIG. 27 shows a block diagram of a method for reconstructing 3D model of a parking space using virtual images according to some embodiments.

FIG. 27 shows a block diagram of a method for reconstructing 3D model of a parking space using virtual images according to some embodiments. The method transforms 2720 the images from the set of images 2710 to produce a set of virtual images 2725 of the scene viewed from virtual viewpoints. The sizes of the sets 2710 and 2725 can be the same or different. In one embodiment, the virtual images are generated as needed when the real images from the set 2710 are failed to be matched to each other. Additionally, or alternatively, the virtual images can be generated proactively.

Next, the method compares 2730 at least some features from the images 2710 and the virtual images 2725 to determine the viewpoint 2735 of each image in the set of images and updates 2740 3D coordinates of at least one point in the model 2745 of the scene to match coordinates of intersections of ray back-projections from pixels of at least two images corresponding to the point according to the viewpoints of the two images. For example, because different pixels from different images 2710 are matched to each other, some embodiments can use stereo triangulation and/or sheet of light triangulation to determine the depth of the scene.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for parking a vehicle within a parking space, wherein the method uses a processor operatively connected to a memory, at least one sensor for acquiring images indicative of environment of at least part of the parking space, and a controller for controlling motion of the vehicle, wherein the processor is coupled with stored instructions implementing the method, wherein the instructions, when executed by the processor carry out at least some steps of the method, comprising:
   controlling motion of the vehicle according to a first parking path ending at a target state, each state of the vehicle includes a position and orientation of the vehicle;
   acquiring a set of images of the parking space during the motion of the vehicle along the first parking path, such that each image in the set of images is acquired from a viewpoint defined by a state of the vehicle along the first parking path;
   constructing a model of the parking space using the set of images;
   growing a graph having multiple nodes connected with edges from a set of seeds corresponding to the set of viewpoints, each node defines the state of the vehicle and each edge connecting two nodes defines a collision free path between the two nodes;
   selecting a set of virtual viewpoints outside of the first parking path including at least one virtual viewpoint defining a state of the vehicle outside of the first parking path, wherein the virtual viewpoints correspond to at least some nodes of the graph;
   generating, using the model of the parking space, a set of virtual images of the environment of the parking space as viewed from the set of virtual viewpoints;
   determining a current state of the vehicle by comparing a current image of the parking space acquired by the sensor while the vehicle is in the current state with at least one virtual image;
   determining a second parking path from the current state to the target state; and
   controlling the motion of the vehicle according to the second parking path.

2. The method of claim 1, wherein the selecting comprises:
   rendering on a display device a representation of the model of the parking space;
   receiving, in response to the rendering, a selection of a direction of the parking;
   determining the second parking path approaching the target state from the selected direction; and
   determining the set of virtual viewpoints on the second parking path.

3. The method of claim 2, wherein the representation of the model of the parking space is a top view image of the parking space.

4. The method of claim 1, wherein the selecting comprises:
   detecting a portion of the parking space free from obstacles using a segmentation of the model of the parking space;
   sampling the portion of the parking space to produce a set of sampled states; and
   selecting the set of virtual viewpoints from the set of sampled states.

5. The method of claim 1, further comprising:
   testing a reachability of the target state from a sampled state using a model of the vehicle stored in the memory; and
   adding a virtual viewpoint corresponding to the sampled state into the set of virtual viewpoints if the target state is reachable from the sampled state.

6. The method of claim 1, further comprising:
   sampling a state in the state space of the parking space to produce a sampled state;
   determining a nearest node of the graph having a state nearest to the sampled state; and
   adding a node for the sampled state to the graph and connecting the added node with the nearest node via an edge if the edge is collision free.

7. The method of claim 1, further comprising:
   rendering on a display device a representation of the model of the parking space;
   receiving, in response to the rendering, a selection of a direction of the parking;
   determining the second parking path approaching the target state from the selected direction through at least some of the nodes and edges of the graph; and
   determining the set of virtual viewpoints on the second parking path.

8. The method of claim 1, wherein the virtual images are produced using one or combination of warping at least one image from the set of images, projecting the model of the scene into the virtual viewpoint, and a plane-induced homography.

9. The method of claim 1, further comprising:
   extracting a set of features from the set of images and the set of virtual images;
   storing in the memory the set of features and a mapping of each feature with a matched state of the vehicle;
   extracting at least one feature from the current image; and
   searching the mapping with the extracted feature to produce the current state of the vehicle.

10. The method of claim 1, further comprising:
    comparing at least some features from the images and the virtual images to determine the viewpoint of each image in the set of images; and
    updating 3D coordinates of at least one point in the model of the parking space to match coordinates of intersections of ray back-projections from pixels of at least two images corresponding to the point according to the viewpoints of the two images.

11. The method of claim 10, wherein the set of images includes a first image of the scene viewed by the sensor in a first pose defining a first viewpoint and includes a second image of the scene viewed by the sensor in a second pose defining a second viewpoint, comprising:
    transforming the first image to generate a first virtual image corresponding to a virtual viewpoint different from the first viewpoint, wherein the transforming preserves correspondence between at least some pixels of the first image and the virtual image to represent the same points of the scene;

comparing at least some features of the second image with at least some features of the virtual image to determine a correspondence among at least some pixels of the second image, the virtual image, and the first image;

determining the second viewpoint of the second image with respect to the first viewpoint of the first image using a subset of the correspondent pixels from the first and the second images based on coordinates of the subset of pixels from the second image and coordinates of points of the scene corresponding to the subset of pixels from the first image; and updating 3D coordinates of the points in the model of the parking space using a bundle adjustment of corresponding pixels in the first and the second images.

12. A system for parking a vehicle within a parking space, comprising:

at least one sensor for sensing information indicative of environment of at least part of the parking space;

a controller for controlling motion of the vehicle according to different trajectories including a first parking path and a second parking path ending at a target state, and each state of the vehicle is defined by a position and orientation of the vehicle;

at least one processor configured for acquiring a set of images of environment of the parking space during the motion of the vehicle along the first parking path, such that each image in the set of images is acquired from a viewpoint defined by a state of the vehicle along the first parking path;

constructing a model of the parking space using the set of images;

selecting a set of virtual viewpoints outside of the first parking path including at least one virtual viewpoint defining a state of the vehicle outside of the first parking path;

generating, using the model of the parking space, a set of virtual images of the environment of the parking space as viewed from the set of virtual viewpoints;

determining a current state of the vehicle by comparing a current image of the parking space acquired by the sensor while the vehicle is in the current state with at least one virtual image;

growing a graph having multiple nodes connected with edges from a set of seeds corresponding to the set of viewpoints, each node defines the state of the vehicle and each edge connecting two nodes defines a collision free path between the two nodes;

determining the second parking path from the current state to the target state using the model of the vehicle, wherein the second parking path approaching the target state from the selected direction is determined through at least some of the nodes and edges of the graph;

determining the set of virtual viewpoints on the second parking path; and a display device for rendering a representation of the model of the parking space and for receiving a selection of a direction of the parking, wherein the processor is further configured for determining the second parking path approaching the target state from the selected direction; and determining the set of virtual viewpoints on the second parking path.

13. The system of claim 12, wherein the representation of the model of the parking space is a top view image of the parking space.

14. The system of claim 12, wherein the virtual images are produced using one or combination of warping at least one image from the set of images, projecting the model of the parking space into the virtual viewpoint, and a plane-induced homography.

15. The system of claim 12, wherein the processor is configured for extracting a set of features from the set of images and the set of virtual images;

storing in a memory the set of features and a mapping of each feature with a matched state of the vehicle;

extracting at least one feature from the current image; and searching the mapping with the extracted feature to produce the current state of the vehicle.

16. The system of claim 12, wherein the processor is configured for comparing at least some features from the images and the virtual images to determine the viewpoint of each image in the set of images; and updating 3D coordinates of at least one point in the model of the parking space to match coordinates of intersections of ray back-projections from pixels of at least two images corresponding to the point according to the viewpoints of the two images.

17. A non-transitory computer readable storage medium embodied thereon a program executable by a processor for performing a method for parking a vehicle within a parking space, the method comprising:

controlling motion of the vehicle according to a first parking path ending at a target state, each state of the vehicle includes a position and orientation of the vehicle;

acquiring a set of images of the parking space during the motion of the vehicle along the first parking path, such that each image in the set of images is acquired from a viewpoint defined by a state of the vehicle along the first parking path;

constructing a model of the parking space using the set of images;

selecting a set of virtual viewpoints outside of the first parking path including at least one virtual viewpoint defining a state of the vehicle outside of the first parking path;

generating, using the model of the parking space, a set of virtual images of the environment of the parking space as viewed from the set of virtual viewpoints;

determining a current state of the vehicle by comparing a current image of the parking space acquired by the sensor while the vehicle is in the current state with at least one virtual image;

comparing at least some features from the images and the virtual images to determine the viewpoint of each image in the set of images;

updating 3D coordinates of at least one point in the model of the parking space to match coordinates of intersections of ray back-projections from pixels of at least two images corresponding to the point according to the viewpoints of the two images;

determining a second parking path from the current state to the target state; and controlling the motion of the vehicle according to the second parking path.

* * * * *